(12) United States Patent
Okamura et al.

(10) Patent No.: US 8,999,023 B2
(45) Date of Patent: Apr. 7, 2015

(54) COMPOSITE SINTERED BODY

(75) Inventors: Katsumi Okamura, Itami (JP); Satoru Kukino, Itami (JP); Tomohiro Fukaya, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 280 days.

(21) Appl. No.: 12/308,069

(22) PCT Filed: May 28, 2007

(86) PCT No.: PCT/JP2007/060811
§ 371 (c)(1),
(2), (4) Date: Dec. 5, 2008

(87) PCT Pub. No.: WO2007/145071
PCT Pub. Date: Dec. 21, 2007

(65) Prior Publication Data
US 2009/0169840 A1 Jul. 2, 2009

(30) Foreign Application Priority Data
Jun. 12, 2006 (JP) .................................. 2006-162624

(51) Int. Cl.
*C09C 1/68* (2006.01)
*B23B 27/14* (2006.01)
(Continued)

(52) U.S. Cl.
CPC ........... *B23B 27/148* (2013.01); *C04B 35/5831* (2013.01); *C04B 35/6261* (2013.01); *C04B 35/6267* (2013.01); *C04B 35/62836* (2013.01); *C04B 35/62897* (2013.01); *C04B 35/6303* (2013.01); *C04B 35/6455* (2013.01); *C04B 2235/3217* (2013.01); *C04B 2235/3804* (2013.01); *C04B 2235/3813* (2013.01);
(Continued)

(58) Field of Classification Search
None
See application file for complete search history.

(56) References Cited

U.S. PATENT DOCUMENTS 5,034,053 A * 7/1991 Nakai et al. ..................... 75/238
5,639,285 A 6/1997 Yao et al.
(Continued)

FOREIGN PATENT DOCUMENTS

EP 1 186 580 A2 3/2002
EP 1 378 497 A1 1/2004
(Continued)

OTHER PUBLICATIONS

European Search Report issued in European Patent Application No. 07744245.7-2111, mailed Jun. 18, 2010.
(Continued)

*Primary Examiner* — Melissa Swain
(74) *Attorney, Agent, or Firm* — McDermott Will & Emery LLP

(57) ABSTRACT

A composite sintered body according to the present invention contains at least cubic boron nitride and a binder. Cubic boron nitride has a continuous skeleton structure as a result of bonding of a plurality of first cubic boron nitride particles to each other. The binder has a continuous structure as a result of bonding of a plurality of binder particles to each other, that are present in a region except for a bonding interface where the first cubic boron nitride particles are bonded to each other. Second cubic boron nitride particles isolated from the first cubic boron nitride particles forming the skeleton structure are dispersed in the continuous structure of the binder particles.

15 Claims, 2 Drawing Sheets

(51) Int. Cl.
C04B 35/5831 (2006.01)
C04B 35/626 (2006.01)
C04B 35/628 (2006.01)
C04B 35/63 (2006.01)
C04B 35/645 (2006.01)

(52) U.S. Cl.
CPC . C04B2235/3856 (2013.01); C04B 2235/3865 (2013.01); C04B 2235/3869 (2013.01); C04B 2235/3886 (2013.01); C04B 2235/3895 (2013.01); C04B 2235/402 (2013.01); C04B 2235/5436 (2013.01); C04B 2235/5472 (2013.01); C04B 2235/661 (2013.01); C04B 2235/786 (2013.01); C04B 2235/80 (2013.01); C04B 2235/85 (2013.01); C04B 2235/9607 (2013.01); C04B 2235/9692 (2013.01)
USPC .............................. 51/307; 428/206; 423/284

(56) References Cited

U.S. PATENT DOCUMENTS

| | | | |
|---|---|---|---|
| 6,001,758 A | 12/1999 | Fukaya et al. | |
| 6,316,094 B1 * | 11/2001 | Fukaya et al. | 428/323 |
| 6,814,775 B2 | 11/2004 | Scurlock et al. | |
| 7,932,199 B2 | 4/2011 | McHale, Jr. et al. | |
| 2004/0002418 A1 | 1/2004 | Scurlock et al. | |
| 2005/0143252 A1 | 6/2005 | Okamura et al. | |
| 2005/0187093 A1 | 8/2005 | McHale et al. | |

FOREIGN PATENT DOCUMENTS

| | | |
|---|---|---|
| EP | 1 547 990 A2 | 6/2005 |
| EP | 1 905 751 A1 | 4/2008 |
| JP | 53-077811 | 7/1978 |
| JP | 56-069350 | 6/1981 |
| JP | 60-14826 | 4/1985 |
| JP | 61-179847 | 8/1986 |
| JP | 61-179848 | 8/1986 |
| JP | 61-1779848 | 8/1986 |
| JP | 61-54857 | 11/1986 |
| JP | 61-54858 | 11/1986 |
| JP | 03-173740 | 7/1991 |
| JP | 05-287433 | 11/1993 |
| JP | 08-126903 | 5/1996 |
| JP | 10-182242 | 7/1998 |
| JP | 11-505770 A | 5/1999 |
| JP | 2000-044347 A | 2/2000 |
| JP | 2002-003834 A | 1/2002 |
| JP | 2002104814 A * | 4/2002 |
| JP | 2003-081677 A | 3/2003 |
| JP | 2004-026555 A | 1/2004 |
| JP | 2004-160637 | 6/2004 |
| JP | 2005-082815 | 3/2005 |
| JP | 2005-187260 | 7/2005 |
| WO | WO-2006/046128 A1 | 5/2006 |
| WO | WO 2007/010670 A1 | 1/2007 |

OTHER PUBLICATIONS

Walmsley, J.C., et al., "A transmission electron microscope study of a cubic boron nitride-based compact material with AlN and AlB$_2$ binder phases", Journal of Materials Science, 1987, pp. 4093-4102, 22, Chapman and Hall Ltd.
Entire prosecution history of U.S. Appl. No. 11/988,800, filed Jan. 15, 2008 entitled Composite Sintered Body.
International Search Report issued in International Patent Application No. PCT/JP2006/310200 dated Jun. 20, 2006.
International Search Report and Written Opinion, w/ English thereof, issued in International Application No. PCT/JP2007/060811 dated Jun. 19, 2007.
European Search Report issued in European Patent Application No. EP 06756456.7 dated Mar. 3, 2011.
Japanese Office Action, with English translation, issued in Japanese Patent Application No. 2007-525907, dated Jul. 12, 2011.
Notice of grounds of rejection mailed on Sep. 25, 2012 for Japanese application 521137/2008 with English Translation thereof.
European Brief Communication issued in European Patent Application No. 07744245.7 dated Sep. 28, 2012.
European Notice of Opposition issued in European Patent application No. 07744245.7 dated Jul. 19, 2012.
Invoice of Sales of Products BZN9000, BZN9100, BZN7000. Jan. 17, 2005.
Invoice of Sales of Products BZN7000. Feb. 7, 2005.
Invoice of Sales of Products BZN9100. Jan. 7, 2005.
Invoice of Sales of Products BZN9100. Apr. 24, 2005.
Invoice of Sales of Products BZN9100, BZN7100. Mar. 4, 2005.
Invoice of Sales of Products BZN9100, BZN7100. Mar. 3, 2005.
Invoice of Sales of Products BZN9100, BZN7000, BZN9000. Mar. 27, 2006.
Invoice of Sales of Products BZN9100. Mar. 10, 2006.
Invoice of Sales of Products BZN9000, BZN7000. Jul. 5, 2005.
Invoice of Sales of Products BZN9100, BZN9000. Sep. 27, 2005.
InVoice of Sales of Products BZN7000. Feb. 11, 2005.
Brochure. "BZN* Compacts Tool Blanks and Inserts; Machining of Ferrous Materials". Diamond Innovations. pp. 1-12. 2004.
Product Analysis. E13—Product Analysis.
Stephen Dole and Jacob Palmer, "Laboratory Analysis of Polycrystalline Cubic Boron Nitride Composites", Sandvik Hyperion, Apr. 4, 2014, pp. E18 / 1-E18 / 9.
"Convolute of photographs of archived sales boxes, invoices and SEM picture", pp. E19 / 1-E19 9.
General Electric Website "www.abrasivesnet.com" printout from internet archive WayBackMachine, Dec. 6, 2004, pp. E20 / 1-E20 / 11.
General Electric Website "www.abrasivesnet.com" printout from internet archive WayBackMachine, Feb. 17, 2003, pp. E21 / 1-E21 / 2.
General Electric Website "www.abrasivesnet.com" printout from internet archive WayBackMachine, Nov. 19, 2005, pp. E22 / 1-E22 / 11.
Brett Young and Dave Ratliff, "Polycrystalline CBN Optimizes Machining of Sintered Iron Materials", originally published in American Machinist, May 1996, pp. E23 / 1-E23 / 5.
European Official Communication (with Opponent's submission in preparation for Oral Proceedings) issued in European Patent Application No. 07744245.7 with date of mailing Apr. 11, 2014.
Statement of Grounds of Appeal issued in European Application No. 07744245.7 with mail date of Nov. 28, 2014.
Analysis of BZN7000, BZN7100, BZN9000 and BZN9100 . . . , Sheets 1-12.
Invoice Reports for Invoice #732514, 1 sheet.
XRD Spectra of BZN7100, E26/1-E26/2.
Affidavit of James Graham, 1 sheet.
Affidavit of Stephen Dole, 1 sheet.
Diamond Innovations' Conditions of Sales, 1 sheet.
Compilation of Declaration by Shape-Master Tool Company, E30/1-E3015, dated Jul. 5, 2014.

* cited by examiner

COMPOSITE SINTERED BODY

RELATED APPLICATIONS

This application is the US National Phase under 35 U.S.C. §371 of International Application No. PCT/JP2007/060811 filed on May 28, 2007, which claims the benefit of Japanese Application No. JP 2006-162624 filed on Jun. 12, 2006, the disclosures of which Applications are incorporated by reference herein.

TECHNICAL FIELD

The present invention relates to a composite sintered body containing at least cubic boron nitride and a binder, and more specifically to a composite sintered body particularly suitably used in an application such as a cutting tool.

BACKGROUND ART

A high-hardness sintered body mainly composed of cubic boron nitride has conventionally been used in an application such as a cutting tool. Such a sintered body is normally implemented by a composite sintered body containing cubic boron nitride and a binder mainly aiming to maintain strength (improvement in wear resistance) of the former and the like. For example, a sintered body having a sea-island structure, in which cubic boron nitride particles (islands) are dispersed in a continuous phase (sea) of the binder (Japanese Patent Laying-Open No. 53-077811 (Patent Document 1) and Japanese Patent Laying-Open No. 10-182242 (Patent Document 2)), has been known.

Such a sea-island structure has been adopted, aiming to promote a sintered state of cubic boron nitride particles to thereby improve chipping resistance such as toughness, by not allowing contact between the cubic boron nitride particles but separating the cubic boron nitride particles from each other in order to avoid an unsintered state of cubic boron nitride caused at a contact portion where the cubic boron nitride particles physically contact with each other.

On the other hand, as the cubic boron nitride particles do not come in contact with each other but are separate from each other (that is, the structure is such that the cubic boron nitride particles are present discontinuously), such an excellent characteristic as high thermal conductivity specific to cubic boron nitride is not sufficiently exhibited, which leads to problems such as insufficient heat resistance or low toughness. Specifically, in the case that the sintered body is used in a cutting tool, increase in a temperature at a cutting edge cannot be suppressed during a cutting process. Moreover, small cracking that originated in the sintered body develops in the binder having low toughness, and chipping is more likely. Therefore, if the sintered body is employed in the cutting tool used in interrupted cutting and high-efficiency cutting such as heavy cutting and high-speed cutting, satisfactory tool life cannot sufficiently be provided in some cases.

Meanwhile, various attempts to improve a composition of the binder in order to solve the above-described problems of the sintered body have been proposed (Japanese National Patent Publication No. 60-014826 (Japanese Patent Laying-Open No. 56-069350, Patent Document 3), Japanese National Patent Publication No. 61-054857 (Japanese Patent Laying-Open No. 61-179847, Patent Document 4), Japanese National Patent Publication No. 61-054858 (Japanese Patent Laying-Open No. 61-179848, Patent Document 5), and Japanese Patent Laying-Open No. 05-287433 (Patent Document 6)). These proposals seem to achieve some effect in improving toughness, however, it has been difficult to drastically improve heat resistance, because the cubic boron nitride particles are separate from each other and the structure is discontinuous.

Meanwhile, a sintered body in which a continuous structure of cubic boron nitride particles is implemented by bonding the particles to each other has been known (U.S. Pat. No. 5,639,285 Specification (Patent Document 7)). In the sintered body, as the cubic boron nitride particles exhibit the continuous structure, an effect to improve heat resistance, that is, an effect to suppress increase in the temperature at the cutting edge, can be expected to some extent. On the other hand, as the binder is scattered discontinuously around the continuous structure of the cubic boron nitride particles, the sintered body is poor in chipping resistance or crater wear resistance, and consequently it is poor in toughness.

It appears that such a defect is mainly attributed to difference in coefficient of thermal expansion between cubic boron nitride and the binder contained in the sintered body. Specifically, the cause is estimated as follows. When the cutting tool including the sintered body is exposed to a high temperature during the cutting process, volume change occurs due to such temperature change (including not only temperature increase but also subsequent cooling). Here, the variation in the volume is considerably different between cubic boron nitride and the binder. Therefore, dissociation between cubic boron nitride and the binder occurs, and consequently, the binder or the like tends to separate from the sintered body.

Such a defect is particularly problematic in cutting a high-hardness material such as quenched steel, because exposure of the cutting edge of the cutting tool to a high temperature of 600° C. or higher is more likely. In addition, improvement in productivity has recently been demanded in a cutting process operation. With the increase in a cutting speed or feed rate, the temperature at the cutting edge is often raised to a temperature around 1000° C. Solution of the problem described above has thus been desired.

In addition, a cutting process of a part having a complicated shape has increasingly been demanded. In high-efficiency cutting such as interrupted cutting involved with more complicated shape, leaving and contact (catching) of the cutting edge of the cutting tool from/with a work material is repeated, and the cutting edge is rapidly cooled when the cutting edge leaves the work material. Accordingly, the sintered body contained in the cutting edge portion experiences sudden temperature change and stress change. Therefore, in high-efficiency process or high-speed interrupted cutting of the high-hardness steel that has recently been demanded, solution of the problems as pointed out above has particularly been desired.

Under the circumstances, it has been demanded to highly attain improvement in both heat resistance and toughness of the sintered body of the cubic boron nitride. Various developments of means for meeting such a demand have been attained, however, in these developments, study has been conducted on the premise that high strength is attained by firmly bonding cubic boron nitride to the binder contained in the sintered body. Therefore, on the premise that more advantageous bonding is obtained with a greater contact area between cubic boron nitride and the binder, at least one of cubic boron nitride and the binder has been implemented as a discontinuous structure instead of the continuous structure, in order to increase the contact area.

Patent Document 1: Japanese Patent Laying-Open No. 53-077811

Patent Document 2: Japanese Patent Laying-Open No. 10-182242

Patent Document 3: Japanese National Patent Publication No. 60-014826 (Japanese Patent Laying-Open No. 56-069350)

Patent Document 4: Japanese National Patent Publication No. 61-054857 (Japanese Patent Laying-Open No. 61-179847)

Patent Document 5: Japanese National Patent Publication No. 61-054858 (Japanese Patent Laying-Open No. 61-179848)

Patent Document 6: Japanese Patent Laying-Open No. 05-287433

Patent Document 7: U.S. Pat. No. 5,639,285 Specification

DISCLOSURE OF THE INVENTION

Problems to be Solved by the Invention

The present invention was made in view of the above-described situations. An object of the present invention is to provide a sintered body of cubic boron nitride achieving improved heat resistance and improved comprehensive strength by enhancing toughness to thereby suppress development of small cracking and even generation of such small cracking itself, namely, a sintered body of cubic boron nitride highly attaining improvement in both heat resistance and strength.

Means for Solving the Problems

The present inventors have fundamentally reexamined the conventional premise that at least one of cubic boron nitride and the binder should be implemented as a discontinuous structure in the composite sintered body containing cubic boron nitride. As a result, the present inventors have conceived that both heat resistance and strength may simultaneously be improved by forming a continuous skeleton structure by bonding cubic boron nitride particles to each other and also forming a continuous structure of a binder as well as attaining a structure in which the cubic boron nitride particles are further dispersed in the continuous structure of the binder. The present invention was completed based on this concept and further study.

Specifically, a composite sintered body according to the present invention contains at least cubic boron nitride and a binder. Cubic boron nitride has a continuous skeleton structure as a result of bonding of a plurality of first cubic boron nitride particles to each other. The binder has a continuous structure as a result of bonding of a plurality of binder particles to each other, that are present in a region except for a bonding interface where the first cubic boron nitride particles are bonded to each other. Second cubic boron nitride particles isolated from the first cubic boron nitride particles forming the skeleton structure are dispersed in the continuous structure of the binder particles.

Here, preferably, relation of $$0.05 \leq X/Y \leq 0.5 \tag{I}$$

is satisfied, where the second cubic boron nitride particles dispersed in the continuous structure of the binder particles have an average particle size of X μm and the first cubic boron nitride particles forming the skeleton structure have an average particle size of Y μm.

In addition, preferably, the isolated second cubic boron nitride particles are dispersed in the continuous structure of the binder particles at a ratio in a range from at least 5 volume % to at most 50 volume %, and more preferably at a ratio in a range from at least 15 volume % to at most 40 volume %.

In addition, preferably, the binder at least contains at least one of a compound and a solid solution of any one element or two or more elements of Ti, Zr, Hf, V, and Cr and any one element or two or more elements of nitrogen, carbon, boron, and oxygen, and an aluminum compound.

The binder may be present at the bonding interface where the first cubic boron nitride particles are bonded to each other at existence probability of at most 60%, and the binder may be present as a part of the continuous structure as a result of its continuity to the continuous structure of the binder particles or as a discontinuous structure isolated from the continuous structure of the binder particles.

The binder may have composition containing at least Ti or Al at the bonding interface where the first cubic boron nitride particles are bonded to each other.

The binder may not be present at the bonding interface where the first cubic boron nitride particles are bonded to each other.

The composite sintered body may have transverse rupture strength after acid treatment of at least 1 gf/mm² to at most 70 kgf/mm².

In the composite sintered body, preferably, a compound other than cubic boron nitride and $Al_2O_3$ is not substantially detected in X-ray diffraction measurement after acid treatment.

The cubic boron nitride may be contained in the composite sintered body by at least 60 volume % to at most 85 volume %, and total cubic boron nitride particles including both of the first cubic boron nitride particles and the second cubic boron nitride particles may have an average particle size of at least 2 μm to at most 10 μm.

Preferably, the composite sintered body has thermal conductivity of at least 60 W/(m·K) to at most 150 W/(m·K).

Preferably, the aluminum compound is implemented by a compound of aluminum, oxygen and nitrogen and/or a compound of aluminum, oxygen, nitrogen, and boron, the aluminum compound has an average particle size of at least 50 nm to at most 1 μm, and a ratio of the aluminum compound in the binder is at least 5 volume % to at most 30 volume %. Here, the composite sintered body may have thermal conductivity of at least 70 W/(m·K) to at most 150 W/(m·K).

Preferably, in the binder, the compound or the solid solution except for the aluminum compound has an average particle size of at most 400 nm.

A cutting tool according to the present invention may at least partially contain the composite sintered body described above.

Effects of the Invention

Structured as described above, the composite sintered body according to the present invention achieves improved heat resistance and improved comprehensive strength by enhancing toughness to thereby suppress development of small cracking and even generation of such small cracking itself. Namely, the composite sintered body highly attains improvement in both heat resistance and strength. In particular, as a result of improvement in chipping resistance and crater wear resistance together with improvement in comprehensive strength, the cutting tool at least partially containing the composite sintered body according to the present invention can suitably be used in high-efficiency process, high-speed interrupted cutting, and heavy interrupted cutting of high-hardness steel.

DESCRIPTION OF THE REFERENCE CHARACTERS

Figure 1:
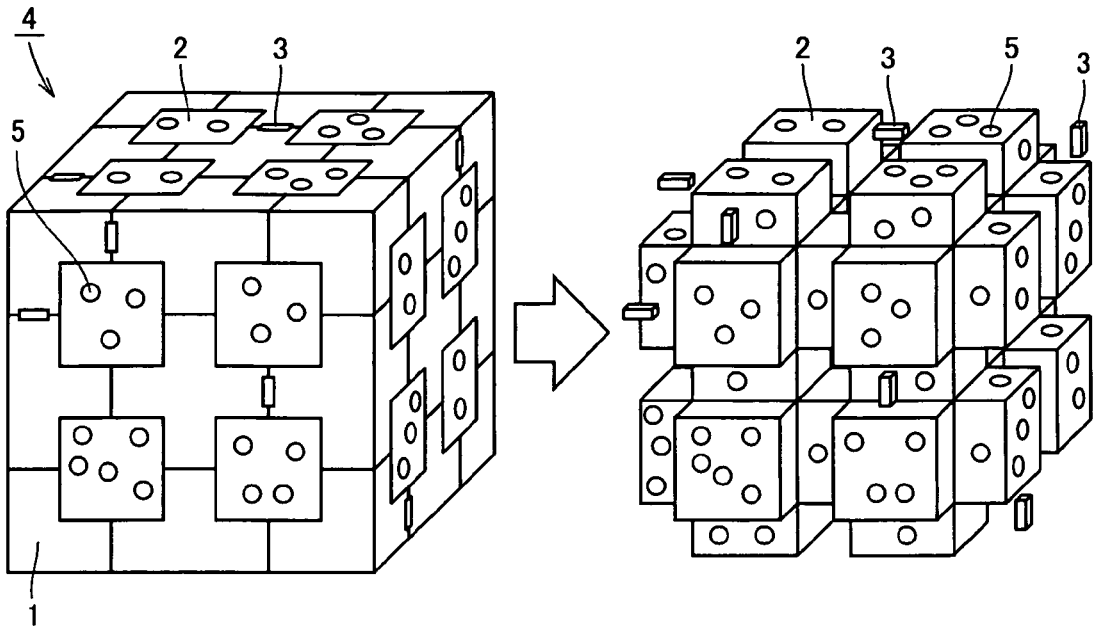
FIG. 1 is a partial perspective view of a composite sintered body conceptually illustrating a manner in which a binder is present as a discontinuous structure isolated from a continuous structure of binder particles at a bonding interface where first cubic boron nitride particles are bonded to each other.

1 first cubic boron nitride particle; 2 binder particle; 3 isolated binder; 4 composite sintered body; 5 second cubic boron nitride particle; 10 treated body; and 11 post.

BEST MODES FOR CARRYING OUT THE INVENTION

The present invention will be described hereinafter in further detail. An embodiment hereinafter will be described with reference to the drawings, and those having the same reference characters allotted in the drawings of the subject application represent the same or corresponding elements.

<Composite Sintered Body>

The composite sintered body according to the present invention contains at least cubic boron nitride and the binder, and it can suitably be employed in an application such as a cutting tool. It is noted that the composite sintered body according to the present invention may contain other components or an inevitable impurity, so long as it contains at least cubic boron nitride and the binder.

<Cubic Boron Nitride>

The cubic boron nitride contained in the composite sintered body according to the present invention has previously been employed in an application such as a cutting tool, for its excellent hardness and thermal conductivity. In the composite sintered body according to the present invention, cubic boron nitride is present in two regions (see, for example, FIG. 1): specifically, one refers to a region exhibiting a continuous skeleton structure as a result of bonding of a plurality of first cubic boron nitride particles 1 to each other; and the other refers to a region in which second cubic boron nitride particles 5 isolated from first cubic boron nitride particles 1 forming the skeleton structure are dispersed in the continuous structure of binder particles 2 which will be described later. For the sake of convenience, the former region is referred to as a skeleton structure region (in the present invention, the cubic boron nitride particles forming the skeleton structure region are referred to as first cubic boron nitride particles), and the latter region is referred to as a fine particle dispersed region (in the present invention, the cubic boron nitride particles included in the fine particle dispersed region are referred to as second cubic boron nitride particles). It is noted that second cubic boron nitride particle 5 or isolated cubic boron nitride particles 5 refer to the cubic boron nitride particles present separately and independently, without contacting with a continuously bonded body of first cubic boron nitride particles 1 forming the skeleton structure.

The composite sintered body according to the present invention highly attains both of excellent heat resistance and excellent strength by having such an unusual structure that cubic boron nitride is included in such two regions and exhibits different manner of presence in each region, and achieves noticeable improvement in strength (improvement in an effect to suppress generation and development of small cracking) in particular by forming the fine particle dispersed region in the binder.

According to such cubic boron nitride, preferably, the first cubic boron nitride particles having a relatively large particle size form the skeleton structure region and the second cubic boron nitride particles having a relatively small particle size form the fine particle dispersed region. More specifically, relation of $$0.05 \leq X/Y \leq 0.5 \tag{I}$$

is particularly preferably satisfied, where the second cubic boron nitride particles dispersed in the continuous structure of the binder particles (that is, the cubic boron nitride particles in the fine particle dispersed region) have an average particle size of X μm and the first cubic boron nitride particles forming the skeleton structure (that is, the cubic boron nitride particles in the skeleton structure region) have an average particle size of Y μm.

If X/Y is smaller than 0.05, the average particle size of the second cubic boron nitride particles in the fine particle dispersed region is relatively too smaller than that of the first cubic boron nitride particles in the skeleton structure region, and an effect to improve strength of the composite sintered body by increasing strength of the binder, that results from addition of the second cubic boron nitride particles, may not sufficiently be obtained. On the other hand, if X/Y exceeds 0.5, the average particle size of the second cubic boron nitride particles in the fine particle dispersed region is relatively too greater than that of the first cubic boron nitride particles in the skeleton structure region, and the continuous structure of the binder particles may not sufficiently be maintained, which may result in lower strength. In addition, as the second cubic boron nitride particles in the fine particle dispersed region are more likely to contact with and bond to the first cubic boron nitride particles in the skeleton structure region, the effect to improve strength of the composite sintered body by increasing strength of the binder may not sufficiently be obtained.

The lower limit of X/Y is set more preferably to at least 0.08 and further preferably to at least 0.12, and the upper limit of X/Y is set to at most 0.4 and further preferably to at most 0.3. The average particle size herein is found as follows. For each of raw material powders of the first cubic boron nitride particles forming the skeleton structure region and raw material powders of the second cubic boron nitride particles forming the fine particle dispersed region, a particle size-cumulative volume correlation graph assuming the total volume of all particles as 100% (graph in which the abscissa represents a particle size and the ordinate represents, in cumulative %, the volume occupied by particles having a particle size smaller than the former particle size) is drawn. Then, a particle size at which cumulative volume percentage attains to 50% is found from the correlation graph as the average particle size. The correlation graph can be drawn by conducting measurement of each of raw material powders by using a particle size distribution measurement apparatus (for example, by using a dynamic light scattering particle size distribution measurement method).

The average particle size found as above correlates well with the average particle size of the cubic boron nitride particles in each region above, that is found by directly observing the composite sintered body using an SEM (scanning electron microscope) or a TEM (transmission electron microscope), and normally, the average particle size found as above is substantially equal to the average particle size found through direct observation. In addition, in direct observation, the particle size of the first cubic boron nitride particles in the skeleton structure region is found as follows. As the first cubic boron nitride particles are bonded to each other, the bonding interface at which particles are bonded to each other is linearly cut in a two-dimensional cross-sectional texture observed with the SEM or the TEM, thereby obtaining individually divided particles. These individual particles (in a polygonal shape) are assumed as virtual particles. Then, assuming circles passing at least two vertices of the virtual particle (in a polygonal shape), a diameter of a circle having a largest diameter is defined as the particle size.

Such cubic boron nitride is preferably contained in the composite sintered body according to the present invention by at least 60 volume % to at most 85 volume %. More preferably, the lower limit of the content is set to at least 65 volume % and further preferably to at least 72 volume %, and the upper limit of the content is set to at most 80 volume % and further preferably to at most 77 volume %.

If the ratio of cubic boron nitride is less than 60 volume %, sufficient contact between the cubic boron nitride particles may not be attained. In such a case, as the continuous skeleton structure may not sufficiently be obtained, increase in the temperature at the cutting edge cannot sufficiently be suppressed, and hence an effect of sufficient improvement in heat resistance may not be obtained. On the other hand, if the ratio of cubic boron nitride exceeds 85 volume %, an amount of the binder present in the sintered body, which will be described later, relatively decreases, and wear resistance may remarkably be lowered.

Such volume percentage can be achieved by setting volume percentage of the cubic boron nitride powders (ratio of blending with the binder powders) used in manufacturing the composite sintered body to a value in the above-described range (that is, from at least 60 volume % to at most 85 volume %). It is noted that such volume percentage can be measured by subjecting the composite sintered body to quantitative analysis using ICP (inductively coupled plasma spectrochemical analysis) or observation using an SEM (scanning electron microscope) or a TEM (transmission electron microscope).

Preferably, the cubic boron nitride particle has an average particle size of at least 2 μm to at most 10 μm (the average particle size herein refers to an average particle size of the total cubic boron nitride particles included in the composite sintered body (the total of cubic boron nitride particles in both of the skeleton structure region and the fine particle dispersed region, that is, the total cubic boron nitride particles including both of the first cubic boron nitride particles and the second cubic boron nitride particles), and refers to a particle size at which cumulative volume percentage with respect to the total particles (that is, the total raw material powders of cubic boron nitride in manufacturing the composite sintered body) found similarly in the above-described manner from the particle size-cumulative volume correlation graph attains to 50%). If the average particle size is smaller than 2 μm, a surface area of the cubic boron nitride particle becomes greater. Accordingly, the number of bonded portions between the first cubic boron nitride particles (sometimes called neck growth) excessively increases, and the binder which will be described later enters a multiple point such as a triple point or a quadruple point among the first cubic boron nitride particles (referring not to the contact interface between the first cubic boron nitride particles but to a gap between the first cubic boron nitride particles; hereinafter simply denoted as the triple point), and the existence probability of the discontinuously isolated binder increases. In addition, as the interface increases, the thermal conductivity may be lowered. Meanwhile, if the average particle size exceeds 10 μm, strength of the composite sintered body is lowered. Accordingly, when the composite sintered body is used in the cutting tool, the cutting edge may be chipped in a severe cutting environment. More preferably, the lower limit of the average particle size is set to at least 2.5 μm and further preferably to at least 2.8 μm, and the upper limit of the average particle size is set to at most 6 μm and further preferably to at most 3.8 μm.

It is noted that the average particle size defined as above is substantially equal to the average particle size found by direct observation using the SEM or the TEM.

Meanwhile, preferably, the isolated second cubic boron nitride particles in the fine particle dispersed region above are dispersed in the continuous structure of the binder particles at a ratio from at least 5 volume % to at most 50 volume %. If this ratio is smaller than 5 volume %, the region where the binder lower in strength (effect to suppress generation and development of small cracking) than cubic boron nitride is present becomes relatively greater, and cracking is more likely at a binder portion in a severe cutting environment such as interrupted cutting. On the other hand, if the ratio exceeds 50 volume %, the region where the binder is present becomes relatively smaller, and wear resistance may significantly be lowered. The lower limit of the ratio is set more preferably to at least 15 volume % and further preferably to at least 20 volume %, and the upper limit thereof is set to at most 40 volume % and further preferably to at most 35 volume %. Such volume percentage can be set by adjusting a ratio of blending the raw material powders in manufacturing the composite sintered body (a ratio of blending the first cubic boron nitride powders forming the skeleton structure region and the second cubic boron nitride powders forming the fine particle dispersed region and a ratio of blending these powders and the binder powders).

Such volume percentage may be measured also by subjecting the composite sintered body to quantitative analysis using ICP (inductively coupled plasma spectrochemical analysis) or observation using the SEM (scanning electron microscope) or the TEM (transmission electron microscope) as described above.

<Binder>

The binder according to the present invention mainly attains a function to hold the cubic boron nitride described above and contribute to improvement in wear resistance, and a composition thereof is not particularly limited, so long as the binder has the continuous structure as will be described later. Therefore, any conventionally known composition for a binder of this type may be employed.

For example, the binder may at least contain at least one of a compound and a solid solution of any one element or two or more elements of Ti, Zr, Hf, V, and Cr and any one element or two or more elements of nitrogen, carbon, boron, and oxygen, and an aluminum compound. This compound or solid solution of these elements can achieve high bonding strength with the cubic boron nitride and it is chemically stable. Therefore, the compound or solid solution is excellent in wear resistance and preferable.

More specifically, any one or more of a nitride, a carbide, a carbonitride, a boride, an oxide, and a solid solution of any one element or two or more elements of Ti, Zr, Hf. V, and Cr may be employed as the compound or solid solution, and more preferably, at least one of a nitride, a boride, an oxide, and a solid solution of any one element or two or more elements of Ti, Zr, Hf, V, and Cr may be employed as the compound or solid solution. This compound or solid solution may be employed because it can attain particularly high bonding strength with cubic boron nitride.

Examples of the aluminum compound include AlN, AlB$_2$, Al$_2$O$_3$, and the like, and particularly preferably, the aluminum compound is implemented by a compound of aluminum, oxygen and nitrogen and/or a compound of aluminum, oxygen, nitrogen, and boron. Suitably, the aluminum compound has an average particle size of at least 50 nm to at most 1 μm, and a ratio of the aluminum compound in the binder (the total amount, if both of the above are present) is set to at least 5 volume % to at most 30 volume %.

When AlN is used as the aluminum compound, improvement in heat resistance can be expected, because AlN is a material excellent in thermal conductivity, as used in a heat sink. Meanwhile, AlN has low strength. Therefore, if a large amount of AlN is present in the composite sintered body, cracking originates from AlN and toughness is lowered. In the case of employing Al$_2$O$_3$, as can be seen from the fact that Al$_2$O$_3$ alone is used as a ceramic tool, Al$_2$O$_3$ has high hardness and is stable at a high temperature, whereas it is poor in thermal conductivity. Therefore, use of a large amount of Al$_2$O$_3$ leads to lowering in thermal conductivity of the composite sintered body and to lowering in heat resistance.

In contrast, the compound of aluminum, oxygen and nitrogen and/or the compound of aluminum, oxygen, nitrogen, and boron are superior to AlN and Al$_2$O$_3$ in strength and superior to Al$_2$O$_3$ in thermal conductivity. Therefore, if the compound having the average particle size of at least 50 nm to at most 1 μm is contained in the binder by at least 5 volume % to at most 30 volume %, the binder excellent in strength and thermal conductivity can be provided, which contributes to improvement in strength and heat resistance of the composite sintered body. Therefore, particularly if such an aluminum compound is present in a manner satisfying the conditions above, the composite sintered body can have thermal conductivity, which will be described later, of at least 70 W/(m·K) to at most 150 W/(m·K).

Moreover, according to the study conducted by the present inventors, the compound of aluminum, oxygen, nitrogen, and boron is selectively present around the cubic boron nitride particles. Therefore, it is estimated that cubic boron nitride supplies nitrogen and boron composing the compound, which seems to serve to strengthen bonding strength between cubic boron nitride and the binder. It is thus estimated that presence of the compound contributes to significant improvement in strength of the composite sintered body.

If the average particle size is smaller than 50 nm, an effect to improve thermal conductivity may be lowered due to increase in the interface. Meanwhile, if the average particle size exceeds 1 μm, strength may be lowered. Preferably, the average particle size is set to at least 80 nm to at most 0.7 μm, and further preferably at least 90 nm to at most 0.2 μm. It is noted that the average particle size can be measured by observing the composite sintered body with an SEM (scanning electron microscope) or a TEM (transmission electron microscope).

If the ratio described above is smaller than 5 volume %, an effect of improvement in strength and thermal conductivity as described above is not obtained and an effect of improvement in bonding strength with cubic boron nitride may not sufficiently be obtained. If the ratio exceeds 30 volume %, the content of a binder component having relatively good toughness other than the aluminum compound is lowered and toughness of the composite sintered body may be lowered. Preferably, the ratio is set to at least 10 volume % to at most 27 volume %. The volume percentage can be measured in quantitative analysis using ICP (inductively coupled plasma spectrochemical analysis) or observation using an SEM (scanning electron microscope) or a TEM (transmission electron microscope).

The compound of aluminum, oxygen and nitrogen is preferably expressed as general formula Al$_X$O$_Y$N$_Z$ (where X=0.5 and Y+Z≤0.5), and the compound of aluminum, oxygen, nitrogen, and boron is preferably expressed as general formula Al$_S$B$_T$O$_U$N$_V$ (where S+T=0.5 and U+V≤0.5). In the following, these compounds may simply be expressed as general formula Al$_X$O$_Y$N$_Z$ and general formula Al$_S$B$_T$O$_U$N$_V$.

In the binder included in the composite sintered body according to the present invention, the compound or the solid solution (illustrated as above) except for the aluminum compound above suitably has an average particle size not larger than 400 nm. This is because, if the average particle size exceeds 400 nm, strength of the binder significantly lowers, which leads to lowering in wear resistance and chipping resistance of the composite sintered body. The average particle size of the compound or the solid solution in the composite sintered body can be measured by observation using an SEM (scanning electron microscope) or a TEM (transmission electron microscope).

<Structure of Composite Sintered Body>

In the composite sintered body according to the present invention, as described already above, cubic boron nitride has the continuous skeleton structure as a result of bonding of a plurality of first cubic boron nitride particles to each other, the binder has the continuous structure as a result of bonding of a plurality of binder particles to each other, that are present in a region except for the bonding interface where the first cubic boron nitride particles are bonded to each other, and the second cubic boron nitride particles isolated from the first cubic boron nitride particles forming the skeleton structure are dispersed in the continuous structure of the binder particles. The composite sintered body is manufactured by sintering cubic boron nitride and the binder, and both of these have the structure continuous to each other as described above. Therefore, the cubic boron nitride and the binder are firmly bonded to each other. In addition, as the fine isolated second cubic boron nitride particles are dispersed in the continuous structure of the binder, strength of the binder itself drastically improves.

The composite sintered body according to the present invention adopts such a characteristic structure as above. Therefore, even if the composite sintered body is included in the cutting tool exposed to a severe cutting environment (such as high-efficiency process, high-speed interrupted cutting, heavy interrupted cutting, or the like of the high-hardness steel described above), the composite sintered body can exhibit sufficient chipping resistance and crater wear resistance and provide satisfactory tool life.

Namely, in the composite sintered body according to the present invention, first of all, the binder or the like does not fall off from the composite sintered body even under the condition as in interrupted cutting where sudden temperature change is repeated, and hence strength can drastically be improved. Such falling off as in the conventional example is considered to be mainly attributable to difference in the coefficient of thermal expansion between cubic boron nitride and the binder as described already. Even if a small cracking due to difference in the coefficient of thermal expansion between cubic boron nitride and the binder takes place at the time of change in the temperature, falling off is effectively prevented because the binder has the continuous structure.

In addition, as both of cubic boron nitride and the binder have the continuous structure as described above, as compared with the structure in which every cubic boron nitride is scattered discontinuously or the structure in which the binder is scattered discontinuously as in the conventional example, bonding strength between cubic boron nitride and the binder can further be firm. This is considered to be attributable to the continuous structure, and considered as an advantageous effect fundamentally overturning the conventional knowledge, that is, the conventional technical knowledge that any one of cubic boron nitride and the binder is scattered discontinuously in order to increase the contact area therebetween and to thereby achieve firm bonding.

Further, by homogenously dispersing the second cubic boron nitride particles isolated from the first cubic boron nitride particles forming the skeleton structure in the continuous structure of the binder particles, such an effect that the region where the binder is present (that is, the thickness of the binder in the continuous structure of the binder) is made relatively smaller is achieved. Specifically, as a result of study by the present inventors, it has been clarified that, as the binder has a characteristic that it is excellent in thermal stability but poor in strength (effect to suppress generation and development of small cracking) as compared with cubic boron nitride, greater thickness of the binder in the continuous structure results in selective damage of the binder portion in a severe cutting environment such as interrupted cutting and in chipping of the cutting edge. As a result of further study, the present inventors have conceived smaller thickness of the binder without lowering the content of the binder is most effective in suppressing chipping of the cutting edge, and have adopted, as measures to implement this concept, homogenous dispersion of the fine second cubic boron nitride particles in the continuous structure of the binder. This is because, if the content of cubic boron nitride present in the binder is the same, presence of the cubic boron nitride particles in an isolated and dispersed state is more likely to relatively decrease the thickness of the binder, as compared with presence thereof as the continuous structure. Consequently, the thickness of the binder can be made smaller without lowering the content of the binder, and lowering in wear resistance attributed to lowering in the content of the binder excellent in thermal stability can be prevented.

Moreover, as cubic boron nitride forming the skeleton structure has the continuous structure, excellent characteristic of high hardness and high thermal conductivity specific to cubic boron nitride can sufficiently be exhibited, thus showing excellent toughness and heat resistance. It is considered that, as the continuous structure of cubic boron nitride exhibits an excellent heat dissipation effect, temperature increase at the cutting edge is suppressed and hence heat resistance is significantly improved, and that as development of small cracking that has occurred within the composite sintered body is prevented by the continuous structure of cubic boron nitride, toughness may further be improved.

With regard to exhibition of high thermal conductivity, more specifically, the composite sintered body according to the present invention has thermal conductivity of at least 60 W/(m·K) to at most 150 W/(m·K). As the thermal conductivity is higher, temperature increase at the cutting edge during cutting is suppressed. Therefore, higher thermal conductivity is preferred. If thermal conductivity exceeds 150 W/(m·K), however, bonded area of the first cubic boron nitride particles excessively increases. Consequently, the binder enters the triple point of the first cubic boron nitride particles, and existence probability of the discontinuously isolated binder increases, which is not preferred. It is noted that thermal conductivity can be calculated by measuring thermal diffusivity with a laser flash or xenon flash thermal diffusivity measurement apparatus, based on specific heat and density.

Here, the expression "has the continuous skeleton structure as a result of bonding of a plurality of first cubic boron nitride particles to each other" refers to a structure completely different from the sea-island structure (Patent Documents 1, 2) in which all the cubic boron nitride particles are dispersed in the continuous binder phase as in the conventional example. The continuous skeleton structure is considered to exhibit a three-dimensional structure in which the first cubic boron nitride particles are three-dimensionally bonded to each other.

Meanwhile, as to the structure of the binder, the expression "has the continuous structure as a result of bonding of a plurality of binder particles to each other, that are present in a region except for the bonding interface where the first cubic boron nitride particles are bonded to each other" refers to a structure completely different from the structure (Patent Document 7) in which the binder is discontinuously scattered around the structure obtained as a result of bonding of the cubic boron nitride particles to each other as in the conventional example, and refers to the continuous structure exhibited as a result of bonding of the binder particles to each other. The continuous structure is considered to exhibit a three-dimensional structure in which binder particles are three-dimensionally bonded to each other.

Here, the reason why the region where the binder particles constituting the continuous structure are present is defined as the region except for the bonding interface where the first cubic boron nitride particles are bonded to each other is to clarify that the composite sintered body of the subject application includes a structure in each manner as described below. Specifically, if the binder is present at the bonding interface where such first cubic boron nitride particles are bonded to each other, the manner of presence of the binder may include any one or both of a manner of presence as a part of the continuous structure as a result of its continuity to the continuous structure of the binder particles and a manner of presence as the discontinuous structure isolated from the continuous structure of the binder particles as shown in FIG. 1. In addition, it is also clarified that, if the binder is not present at the bonding interface between such first cubic boron nitride particles, the composite sintered body of the subject application may also encompass such a manner that the binder is not present.

FIG. 1 is a partial perspective view of a composite sintered body 4 conceptually illustrating a manner in which the binder is present as the discontinuous structure isolated from the continuous structure of binder particles 2 at the bonding interface where first cubic boron nitride particles 1 are bonded to each other. Namely, FIG. 1 shows, on the right with respect to the central arrow, the manner in which first cubic boron nitride particles 1 are conceptually removed from composite sintered body 4 shown on the left, and shows on the right that the binder at the bonding interface is present as an isolated binder 3.

If the binder is present at the bonding interface between the first cubic boron nitride particles, preferably, the binder is present at the existence probability of at most 60%, and the binder is present as a part of the continuous structure as a result of its continuity to the continuous structure of the binder particles or as the discontinuous structure isolated from the continuous structure of the binder particles. Preferably, the binder at the bonding interface where the first cubic boron nitride particles are bonded to each other has composition containing at least Ti or Al. It is most preferable from a point of view of thermal conductivity that the first cubic boron nitride particles can directly be bonded to each other firmly, without including the binder at the bonding interface. However, if the existence probability of the binder at the bonding interface between the first cubic boron nitride particles is set to 60% or lower, lowering in thermal conductivity can be minimized by ensuring continuity between the first cubic boron nitride particles. If the binder is composed of a component containing Ti or Al element having high affinity to oxygen, the component serves as a getter of adsorbed oxygen that has remained at the bonding interface between the first cubic boron nitride particles during sintering. Therefore, alteration of the cubic boron nitride particles themselves resulting from solid solution of oxygen in cubic boron nitride or increase in thermal resistance due to generation of an oxidized phase at the bonding interface between the first cubic boron nitride particles can be prevented. If the existence probability exceeds 60%, a large amount of binder having thermal conductivity lower than cubic boron nitride is present and thermal conductivity of the composite sintered body as a whole is lowered, which is not preferred. As such, as described above, it is particularly preferable that the binder is not present at the bonding interface between the first cubic boron nitride particles. Here, the existence probability of 60% or lower means that the binder is detected at measurement points accounting for at most 60% of all measurement points when AES (Auger electron spectroscopy) analysis or EDS (energy dispersive X-ray spectroscopy) analysis is conducted at a plurality of measurement points at one bonding interface between the first cubic boron nitride particles.

In the description above, the expression "the first cubic boron nitride particles or the binder particles are bonded to each other" means that, though crystal orientation of each particle may be different from each other, the particles are firmly bonded to each other at the bonding interface between the particles as a result of some kind of chemical bond or physical bond, or involvement of a third compound. In addition, the expression "the cubic boron nitride and the binder are bonded to each other" in the description above means that the cubic boron nitride and the binder are firmly bonded to each other as a result of some kind of chemical bond or physical bond, or involvement of a third compound, as in the case of bonding between the particles above.

The continuous skeleton structure obtained as a result of bonding of the first cubic boron nitride particles to each other and the continuous structure obtained as a result of bonding of a plurality of binder particles to each other, that are present in a region except for the bonding interface where the first cubic boron nitride particles are bonded to each other, can be confirmed by subjecting the composite sintered body to acid treatment, thereafter subjecting the treated body to XRD (X-ray diffraction) measurement, visually observing appearance of the treated body, and measuring transverse rupture strength. In addition, dispersion of the second cubic boron nitride particles isolated from the first cubic boron nitride particles forming the skeleton structure in the continuous structure of the binder particles can be confirmed by subjecting the sintered body texture to observation with an SEM (scanning electron microscope) or a TEM (transmission electron microscope).

Here, initially, the acid treatment refers to a treatment in which a mixed acid obtained by mixing concentrated nitric acid (60%), distilled water and concentrated hydrofluoric acid (47%) at a volume ratio of 2:2:1 and the composite sintered body cut into a prescribed size (in a rectangular shape of length 6 mm×width 3 mm×thickness 0.5 mm) are placed in an airtight container and the composite sintered body is dissolved under pressure for 48 hours at a temperature of 140° C.

Figure 2:
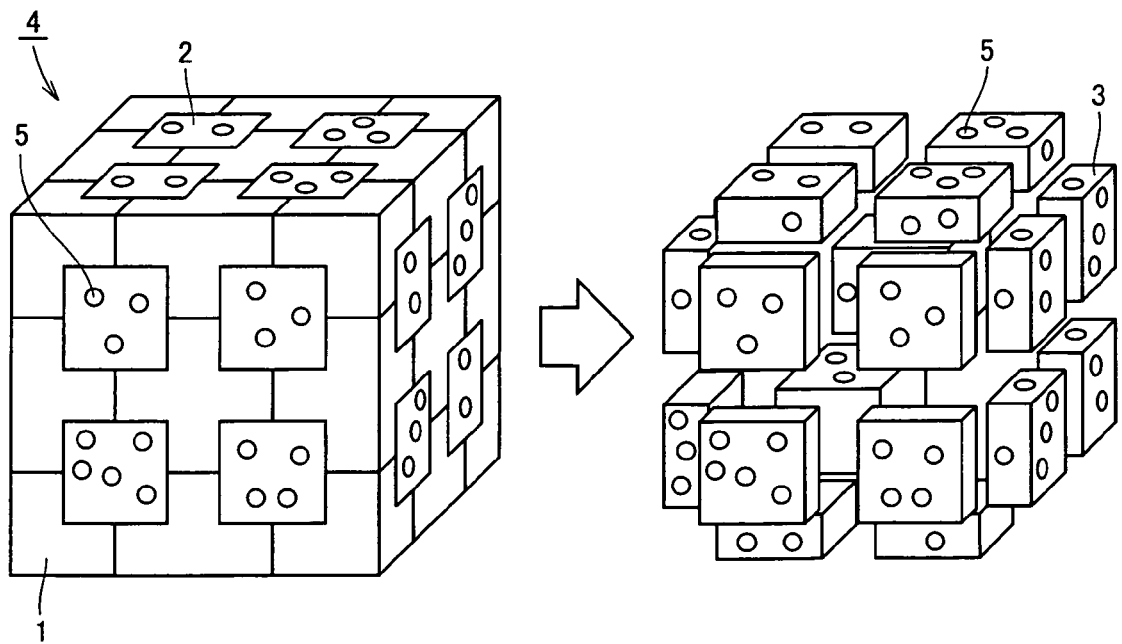
FIG. 2 is a partial perspective view of a composite sintered body conceptually illustrating a manner in which a binder is present as a discontinuous structure isolated from a continuous structure of binder particles at a triple point among first cubic boron nitride particles.

Successively, the treated body subjected to the acid treatment is in turn subjected to XRD measurement. If the binder component is not detected in the measurement, it indicates that the binder has completely been removed from the composite sintered body, and the continuous structure of the binder is confirmed. The mixed acid serves to selectively dissolve the binder and remove solely the binder. If the binder is implemented as the discontinuous structure instead of the continuous structure according to the subject application, it is considered that the isolated binder structured like an island and surrounded by the cubic boron nitride is present as shown in FIG. 2 and the isolated binder is not dissolved and removed in the acid treatment but remains in the treated body. Consequently, the binder component is detected in the XRD measurement. It is noted that, in addition to cubic boron nitride, $Al_2O_3$ is not dissolved and removed either in the acid treatment, and if the binder contains $Al_2O_3$, a trace amount of $Al_2O_3$ may be detected. In such a case, however, as there is no possibility that the binder is composed solely of $Al_2O_3$, determination as to whether the binder exhibits the continuous structure can be made based on detection of other components composing the binder. Therefore, in the composite sintered body according to the present invention, particularly preferably, a compound other than cubic boron nitride and $Al_2O_3$ is not substantially detected in the X-ray diffraction measurement after the acid treatment.

FIG. 2 is a partial perspective view of composite sintered body 4 conceptually illustrating a manner in which the binder is present as the discontinuous structure isolated from the continuous structure of binder particles 2 at the triple point among first cubic boron nitride particles 1. Namely, FIG. 2 shows, on the right with respect to the central arrow, the manner in which first cubic boron nitride particles 1 are conceptually removed from composite sintered body 4 shown on the left, and shows on the right that binder particles 2 are present as isolated binder 3.

If the binder is present as the discontinuous structure isolated from the continuous structure of the binder particles at the bonding interface between the first cubic boron nitride particles as shown in FIG. 1, the binder may be detected as the binder component in the X-ray diffraction measurement. Accordingly, if the binder component is detected in this manner, origin of the binder component, that is, whether the binder is present as the discontinuous structure at the bonding interface between the first cubic boron nitride particles (FIG. 1) or as the isolated, discontinuous structure like an island surrounded by the first cubic boron nitride particles (FIG. 2), can be determined by measuring the transverse rupture strength after the acid treatment which will be described later. Detailed description will be provided later.

Thereafter, appearance of the treated body is visually observed. If the cubic boron nitride does not have the continuous skeleton structure as above but has the structure in which entire cubic boron nitride is discontinuous as in the conventional example, the treated body becomes powdery and collapses after the acid treatment, and exhibits appearance completely different from the sintered body prior to treatment. In contrast, if the cubic boron nitride has the continuous skeleton structure as above, the treated body maintains the original shape exhibited prior to the acid treatment. Here, the expression "maintains the original shape" means that the original body is not divided into two or more parts in a handling under the load lower than 1 gf/mm² in a normal filtration operation or the like. In this manner, the continuous structure of cubic boron nitride can be confirmed by visually observing the appearance of the treated body after the acid treatment.

If cubic boron nitride apparently has the continuous structure but the particles simply come in contact with each other instead of bonding to each other, bonding strength between the particles is weak, although the original shape is maintained to some extent after the acid treatment. Accordingly, an edge portion of the treated body is partially detached during the acid treatment, or the treated body readily collapses in the handling under the stress lower than 1 gf/mm². Therefore, difference from the continuous structure of the subject application can readily be found.

Figure 3:
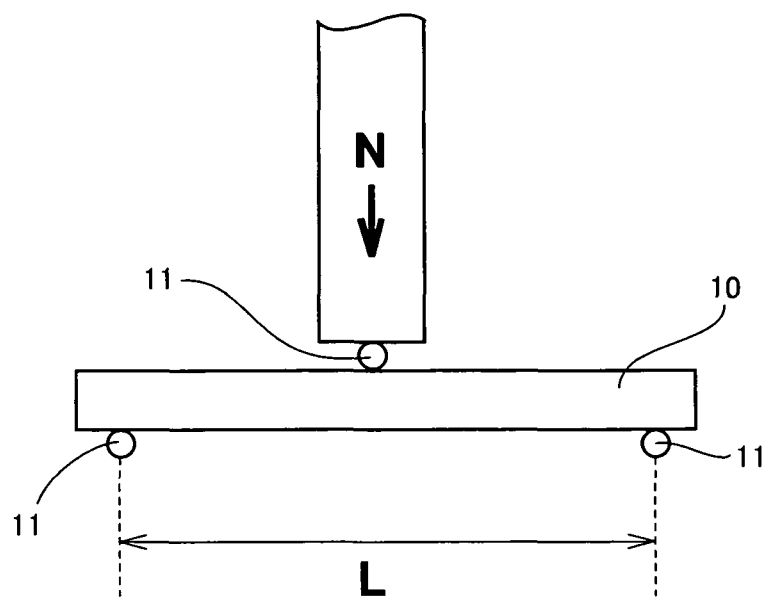
FIG. 3 is a schematic diagram illustrating a method of measuring transverse rupture strength.

Successively, transverse rupture strength of the treated body is measured. In the measurement, as shown in FIG. 3, a condition that three points in a treated body 10 in a rectangular shape (length 6 mm×width 3 mm×thickness 0.5 mm) are supported by three posts 11 (diameter 2 mm) and span L is set to 4 mm is adopted. Then, a load N is applied to an intermediate portion of span L, and load N at the time when treated body 10 is broken is measured as the transverse rupture strength. In the present invention, preferably, the transverse rupture strength attains to a value from at least 1 gf/mm² to at most 70 kgf/mm². The high transverse rupture strength is shown because the cubic boron nitride has the continuous structure as described above, and if the cubic boron nitride is implemented as the discontinuous structure, the transverse rupture strength is lower than 1 gf/mm². Here, higher transverse rupture strength is preferred, and it is not necessary to define the upper limit thereof. If the transverse rupture strength exceeds 70 kgf/mm², however, the number of bonding interfaces present between the first cubic boron nitride particles becomes excessively large, and it is more likely that the binder is discontinuously taken in the triple point of the first cubic boron nitride particles. Specifically, if the binder is present as the isolated, discontinuous structure like an island surrounded by the first cubic boron nitride particles (FIG. 2) as described above, the transverse rupture strength attains to a value exceeding 70 kgf/mm². In contrast, if the transverse rupture strength attains to 70 kgf/mm² or lower in spite of detection of the binder component after the acid treatment, it indicates that the binder is present as the discontinuous structure at the bonding interface between the first cubic boron nitride particles (FIG. 1).

The cubic boron nitride particles contained in the mixed acid after the acid treatment above are observed with the SEM (scanning electron microscope). Specifically, in the composite sintered body according to the present invention, the second cubic boron nitride particles are dispersed in the continuous structure of the binder particles in the fine particle dispersed region. Accordingly, when the continuous structure of the binder is dissolved in the acid treatment, a part of the dispersed second cubic boron nitride particles is also contained in the mixed acid. As described above, as the first cubic boron nitride particles forming the skeleton structure are not dissolved in the mixed acid for the acid treatment, a part of cubic boron nitride that has been dispersed in the continuous structure of the binder is contained in the mixed acid in a particulate state and presence thereof is thus confirmed. Here, relatively large particles among the fine second cubic boron nitride particles dispersed in the continuous structure of the binder are trapped in the skeleton structure formed by the continuous first cubic boron nitride particles. Therefore, though not all of the second cubic boron nitride particles that have been dispersed in the continuous structure of the binder particles are contained in the mixed acid, at least presence of the cubic boron nitride particles contained in the mixed acid indicates presence of the second cubic boron nitride particles in a manner dispersed in the continuous structure of the binder particles.

<Method of Manufacturing Composite Sintered Body>

The composite sintered body according to the present invention can be manufactured in the following manner. Initially, cubic boron nitride powders and binder powders that are raw material powders are mixed. The mixture is sintered under the condition of pressure and temperature at which cubic boron nitride is not converted to hexagonal boron nitride, or the binder component is externally infiltrated into the mixture during sintering under the condition of pressure and temperature at which cubic boron nitride is not converted to hexagonal boron nitride.

Here, preferably in sintering the mixed powders, when the mixed powders fill a capsule made of refractory metal (for example, a capsule made of Mo (molybdenum)) for fabricating a sintered body, the capsule is filled with the mixed powders such that the mixed powders are sandwiched by metal foils made of an alloy of Ti and Al, and then sintered. The metal foil serves to implement the binder and has a melting point not higher than the sintering temperature. Accordingly, the metal foil turns to liquid during sintering and permeates through the mixed powders, whereby both of the cubic boron nitride particles and the binders can attain the continuous structure. In addition, it is not that the all binder components are mixed with the cubic boron nitride powders in advance but that the binder component is externally infiltrated into the mixed powders of the cubic boron nitride powders and (a relatively small amount of) binder powders during sintering. Therefore, the composite sintered body according to the present invention achieving further improved continuity between the first cubic boron nitride particles and between the binder particles can be manufactured. Particularly, as the alloy permeates through a small gap between the first cubic boron nitride particles, the binder present at the triple point of the first cubic boron nitride particles is not isolated and continuity of the structure of the binder is enhanced.

Here, in fabricating the mixed powders above, the raw material powders of cubic boron nitride and the binder powders prepared in advance are mixed by using a ball mill. Here, cubic boron nitride particles having a smaller particle size (approximately from 0.05 μm to 2.0 μm) (to be dispersed in the continuous structure of the binder) and the binder powders are homogenously mixed in advance by using the ball mill, and successively, cubic boron nitride particles having a larger particle size (approximately from 2.0 μm to 6.0 μm) (for forming the continuous skeleton structure) are added, and mixing using the ball mill is again performed. Thus, the mixed powders, in which the cubic boron nitride particles having a smaller particle size are homogenously dispersed in a manner surrounded by the binder particles, are obtained. In addition, in order to reliably achieve the dispersed (discontinuous) structure of the cubic boron nitride particles smaller in particle size, solely the cubic boron nitride particle smaller in particle size is preferably coated with the binder in advance with physical vapor deposition (PVD) or the like. This is because contact between the cubic boron nitride particles having a smaller particle size with each other as well as contact between the cubic boron nitride particles having a smaller particle size and the cubic boron nitride particles having a larger particle size can be avoided.

Conditions such as pressure history and temperature history should preferably be controlled such that a prescribed condition for pressure and temperature at which cubic boron nitride is thermodynamically stable is set during sintering. Before specifically describing the conditions in the subject application, initially, a general condition for obtaining a sintered cubic boron nitride body will be described. Initially, pressure is applied to the mixed powders of cubic boron nitride and the binder as described above at a low temperature so as to promote consolidation, and thereafter the mixed powders are sintered at a raised temperature. For example, after the pressure is raised to 4 to 6 GPa at a room temperature, the temperature is raised to 1300 to 1800° C. Sintering is performed with the highest temperature being maintained.

Under the conventional sintering condition as above, however, it is considered as follows. Specifically, the binder having low hardness is mainly broken during application of pressure, and the broken, fine binder slides in between the cubic boron nitride particles. In addition, the cubic boron nitride particles having high hardness and less likely to be broken than the binder are arranged to surround the binder, thus forming the triple point. Then, the mixed powders are sintered by heating while consolidation in that small region no longer proceeds. Consequently, it is estimated that a texture structure of the sintered body in which the region where the binder is introduced in between the cubic boron nitride particles or the binder region having the discontinuous structure surrounded by the cubic boron nitride particles is scattered is created.

Here, the following conditions are adopted as specific conditions for a sintering method of the subject application. Initially, the pressure and the temperature are once raised to 2 to 5 GPa and 1000 to 1500° C. respectively, at which cubic boron nitride particles are thermodynamically stable (pressurization and temperature increase are simultaneously performed), and this pressure and temperature condition is maintained for 1 to 5 minutes. Sintering thus initially proceeds simultaneously with consolidation, in a portion where the cubic boron nitride particles having a larger particle size come in contact with each other. Here, it is considered that the binder is softened and plastically deforms along with temperature increase and that fluidity is enhanced. Therefore, it is considered that the binder slides into the gap (permeates) between the cubic boron nitride particles having a larger particle size even when the cubic boron nitride particles are arranged to surround the binder, and thus the continuous structure of the binder is maintained. In addition, in this pressurization and temperature increase process, the binder surrounding the cubic boron nitride particle having a smaller particle size slides into the gap between the cubic boron nitride particles having a larger particle size while sintering proceeds in the portion where the cubic boron nitride particles having a larger particle size come in contact with each other, and thereafter, further consolidation is suppressed. Consequently, it is considered that the cubic boron nitride particles having a smaller particle size maintain a state dispersed in the continuous structure of the binder particles, and that the dispersed (discontinuous) structure is thus formed in the continuous structure of the binder.

After both of cubic boron nitride and the binder have attained the continuous structure as described above, the pressure and the temperature are again raised to 5 to 8 GPa and 1400 to 2000° C. respectively, at which cubic boron nitride is still thermodynamically stable (pressurization and temperature increase are simultaneously performed), and this pressure and temperature condition is maintained for 1 to 15 minutes. It is estimated that bonding between the cubic boron nitride particles, between the binder particles, and between the cubic boron nitride particles and the binder particles is thus further strengthened.

It is noted that bonding between the first cubic boron nitride particles, between the binder particles, and between the cubic boron nitride particles and the binder particles can further be strengthened by reforming the surface of the cubic boron nitride particles and the binder particles. Here, surface reformation is performed, for example, through plasma treatment in hydrogen or heat treatment in an ammonia atmosphere, of raw material powders before sintering. Alternatively, in order to strengthen direct bonding between the cubic boron nitride particles having a larger particle size, it is also effective to add a compound of carbon, hydrogen and nitrogen, such as melamine, that has a catalytic action on the mixed powders before sintering.

<Cutting Tool>

The cutting tool according to the present invention at least partially contains the composite sintered body described above. For example, a cutting-edge nose portion serving as a central point of application in cutting may be formed from the composite sintered body above. Alternatively, a cutting edge portion may be formed from the composite sintered body, or the entire surface of a rake face including the cutting edge portion may be formed from the composite sintered body. Further alternatively, the cutting tool in its entirety may be formed from the composite sintered body.

As described above, the structure of the cutting tool according to the present invention is not particularly limited, so long as the structure at least partially contains the composite sintered body above. In the case that a part of the cutting tool is formed from the composite sintered body according to the present invention, any conventionally known base material used as the base material for the cutting tool of this type can implement the remaining part. As such a base material, for example, hardmetal (such as WC-based hardmetal, a material containing Co in addition to WC, or a material to which carbonitride of Ti, Ta, Nb, or the like is further added), cermet (mainly composed of TiC, TiN, TiCN, or the like), high-speed steel, ceramics (titanium carbide, silicon carbide, silicon nitride, aluminum nitride, aluminum oxide, and a mixture thereof), sintered diamond, sintered silicon nitride, or the like is employed.

EXAMPLE

In the following, the present invention will be described in detail with reference to examples, however, the present invention is not limited thereto.

Example 1

Initially, $Ti_XN_Y$ (where X=1 and Y=0.6) powders (average particle size 2.0 μm) and Al powders (average particle size 20 μm) were homogenously mixed at a mass ratio of 80:20, and thereafter the mixed powders were subjected to heat treatment for 30 minutes at a temperature of 1200° C. in vacuum using a vacuum furnace. Thereafter, a ball mill constituted of a pot made of hardmetal and a ball made of hardmetal was used to break the mixed powders that were subjected to heat treatment as described above, thus obtaining the raw material powders for the binder. As to the average particle size of the powders above, as in the case of the average particle size of the cubic boron nitride particles described previously, the particle size at which cumulative volume percentage attains to 50% was found from the particle size-cumulative volume correlation graph, and this particle size was defined as the average particle size.

In succession, a high-frequency sputtering physical vapor deposition (RF sputtering PVD) apparatus was used to coat the cubic boron nitride powder having a smaller particle size (average particle size 1.2 μm) with TiN (composing the binder). Observing the coated powder with the TEM (transmission electron microscope), it was found that the cubic boron nitride powder was substantially homogenously coated with TiN to an average layer thickness of 50 nm. The powders provide the second cubic boron nitride particles to be dispersed in the continuous structure of the binder particles.

The TiN-coated cubic boron nitride powders obtained as above and the cubic boron nitride powders having a larger particle size (average particle size 4.0 μm, not coated with the binder, and mainly forming the skeleton structure) were prepared, to satisfy a volume ratio of 1:6. Thereafter, the ball mill above was used to homogenously mix these cubic boron nitride powders and the raw material powders for the binder above, such that a blending ratio of these cubic boron nitride powders attains to 70 volume %. Here, the content of the second cubic boron nitride particles dispersed in the continuous structure of the binder particles attains to 25 volume %. In addition, after the TiN-coated cubic boron nitride powders and the binder powders were mixed in advance, the cubic boron nitride powders having a larger particle size were added and mixed again, so as to achieve homogenous dispersion. Thereafter, the mixed powders were held in the vacuum furnace for 20 minutes at a temperature of 900° C. for degassing.

Then, the mixed powders degassed as described above were sandwiched between the metal foils made of TiAl alloy (Ti (50 atomic %) Al (50 atomic %)) and filled the capsule made of molybdenum (Mo). Thereafter, the pressure and the temperature were simultaneously raised to 3 GPa and 500° C. using an ultra-high pressure apparatus respectively, and the mixed powders were maintained for 2 minutes under this pressure and temperature condition.

Successively, the pressure and the temperature were again simultaneously raised to 6.5 GPa and 1650° C. using this apparatus respectively, and the mixed powders were further maintained for 15 minutes under this pressure and temperature condition for sintering. The composite sintered body according to the present invention at least containing cubic boron nitride and the binder was thus manufactured.

The composition of the composite sintered body was specified in XRD measurement (for the sake of convenience, denoted as initial XRD measurement) and thermal conductivity thereof was measured. Measurement of thermal conductivity was performed before the acid treatment which will be described later. Specifically, after the composite sintered body obtained as above was formed in a shape of isosceles triangle having a vertex angle of 80°, a base of 4 mm and a thickness of 1 mm, thermal diffusivity was measured with a laser flash thermal diffusivity measurement apparatus, and thermal conductivity was calculated based on specific heat and density. Successively, the composite sintered body was subjected to TEM (transmission electron microscope) observation, and EDS analysis and AES (Auger electron spectroscopy) analysis, so as to conduct element analysis at the bonding interface between the first cubic boron nitride particles in the skeleton structure, thus calculating the composition (type of the element) and the existence probability of the binder present at the bonding interface. Table 1 below shows the result. It is noted that, in Table 1, TiN ($Ti_xN_y$ above is simply denoted as TiN; denoted similarly hereinafter), $TiB_2$, AlN, $AlB_2$, and $Al_2O_3$ other than cubic boron nitride (denoted as cBN; denoted similarly hereinafter) are components composing the binder. Though these components are different from the composition of the raw material powders for the binder above, it is considered to be attributable to chemical reaction to cubic boron nitride during sintering.

Table 1 also shows a ratio of the average particle sizes X/Y, where the second cubic boron nitride particles dispersed in the continuous structure of the binder particles have an average particle size of X μm and the first cubic boron nitride particles forming the skeleton structure have an average particle size of Y μm. Here, the average particle sizes X μm and Y μm were also equal to the average particle sizes found by directly observing the composite sintered body with the SEM and the TEM.

The average particle size of total cBN in the composite sintered body in Table 1 refers to the average particle size of the total cubic boron nitride particles contained in the composite sintered body, and refers to the average particle size of the raw material powders above (calculated as the particle size at which cumulative volume percentage attains to 50%, found from the particle size-cumulative volume correlation graph directed to the total raw material powders, as described above). In addition, the cBN content in the composite sintered body is determined by the blending ratio of the raw material powders as described above. The cBN content in the binder can be obtained by finding the content of the binder based on the cBN content in the composite sintered body and by performing calculation based on this content and the volume ratio between the TiN-coated cubic boron nitride powders and the cubic boron nitride powders having a larger particle size.

Successively, after the composite sintered body according to the present invention manufactured as above was formed in a rectangular shape having length 6 mm×width 3 mm×thickness 0.5 mm, the composite sintered body was subjected to acid treatment (as described above, the treatment in which the mixed acid obtained by mixing concentrated nitric acid (60%), distilled water and concentrated hydrofluoric acid (47%) at a volume ratio of 2:2:1 was used and dissolution under pressure was performed for 48 hours at a temperature of 140° C.). Then, XRD measurement of the treated body subjected to acid treatment in this manner was performed to specify the composition after acid treatment, and appearance was visually observed. Table 1 below shows the result.

Successively, the transverse rupture strength of the treated body above was measured, using the method described with reference to FIG. 3. Table 1 below shows the result.

Meanwhile, the cutting tool was fabricated using the composite sintered body manufactured as above (before acid treatment). Specifically, the composite sintered body manufactured as above was brazed to a base material made of hardmetal and formed in a prescribed shape (ISO model No. SNGA120408), to fabricate the cutting tool. Using this cutting tool, a cutting test in which high-speed heavy interrupted cutting is performed was conducted under the conditions below, so as to determine the tool life until it is chipped. Table 1 below shows the result.

<Condition for Cutting Test>
Work material: Carburized and quenched steel SCM415H, HRC62 (diameter 100 mm×length 300 mm; 4 U-shaped grooves in axial direction of the work material)
Cutting speed: V=200 m/min.
Feed rate: f=0.15 mm/rev.
Depth of cut: d=0.3 mm
Wet/Dry: Dry Examples 2 to 3

The composite sintered body according to the present invention was manufactured as in Example 1, except that the content of the second cubic boron nitride particles in the binder was changed from 25 volume % in Example 1 to 4 volume % (Example 2) or to 67 volume % (Example 3) by changing the blending ratio of the TiN-coated cubic boron nitride powders and the cubic boron nitride powders having a larger particle size. As the blending ratio of the cubic boron nitride particles was thus changed, the average particle size (relating to the total cubic boron nitride particles contained in the composite sintered body) was also changed. Table 1 below shows each performance of the composite sintered body, obtained as a result of measurement or test as in Example 1.

Examples 4 to 6

The composite sintered body according to the present invention was manufactured as in Example 1, except that $Zr_XN_Y$ (where X=1 and Y=0.6) powders (Example 4), $Ti_XC_YN_Z$ (where X=1 and Y=Z=0.3) powders (Example 5), or $Hf_XN_Y$ (where X=1 and Y=0.6) powders (Example 6) were used instead of $Ti_XN_Y$ (where X=1 and Y=0.6) powders in Example 1. Table 1 below shows each performance of the composite sintered body, obtained as a result of measurement or test as in Example 1.

Examples 7 to 9

The composite sintered body according to the present invention was manufactured as in Example 1, except that blending ratio of the cubic boron nitride powders was changed from 70 volume % in Example 1 to 75 volume % (Example 7), to 80 volume % (Example 8), or to 65 volume % (Example 9) (as the content of the second cubic boron nitride particles in the continuous structure of the binder particles was maintained constant, the average particle size was changed). Table 2 below shows each performance of the composite sintered body, obtained as a result of measurement or test as in Example 1.

Examples 10 to 15

The composite sintered body according to the present invention was manufactured as in Example 1, except that the average particle size of the TiN-coated cubic boron nitride powders and the average particle size of the cubic boron nitride powders having a larger particle size (not coated with TiN) in Example 1 were changed to 0.5 µm and 2.5 µm (Example 10), to 1.2 µm and 2.0 µm (Example 11), to 0.2 µm and 6.0 µm (Example 12), to 0.36 µm and 6.0 µm (Example 13), to 0.5 µm and 5.0 µm (Example 14), or to 1.8 µm and 4.0 µm (Example 15), respectively. Tables 2 and 3 below show each performance of the composite sintered body, obtained as a result of measurement or test as in Example 1.

Examples 16 to 19

The composite sintered body according to the present invention was manufactured as in Example 1, except that the content of the second cubic boron nitride particles in the binder was changed from 25 volume % in Example 1 to 6 volume % (Example 16), to 15 volume % (Example 17), to 35 volume % (Example 18), or to 45 volume % (Example 19) by changing the blending ratio of the TiN-coated cubic boron nitride powders and the cubic boron nitride powders having a larger particle size. As the blending ratio of the cubic boron nitride particles was thus changed, the average particle size (relating to the total cubic boron nitride particles contained in the composite sintered body) was also changed. Table 3 below shows each performance of the composite sintered body, obtained as a result of measurement or test as in Example 1.

Comparative Example 1

The composite sintered body according to the comparative example was manufactured as in Example 1, except for two points, that is, except for not using the metal foil made of TiAl alloy (Ti (50 atomic %) Al (50 atomic %)) in filling the capsule made of molybdenum (Mo) with the mixed powders and except for adopting such conditions that the pressure was raised to 5 GPa at a room temperature and thereafter the temperature was raised to 1500° C. as in the conventional method, followed by sintering for 15 minutes, instead of the condition for sintering in Example 1. Table 4 below shows each performance of the composite sintered body, obtained as a result of measurement or test as in Example 1.

Comparative Example 2

The composite sintered body according to the comparative example was manufactured as in Comparative Example 1, except that blending ratio of the cubic boron nitride powders was changed from 70 volume % in Comparative Example 1 to 85 volume %. Table 4 below shows each performance of the composite sintered body, obtained as a result of measurement or test as in Example 1.

Comparative Example 3

The composite sintered body according to the comparative example was manufactured as in Example 1, except that solely non-coated cubic boron nitride having a larger particle size was used without using the TiN-coated cubic boron nitride in Example 1 and that the content of the cubic boron nitride in the continuous structure of the binder particles was changed from 25 volume % in Example 1 to 0 volume %. Table 4 below shows each performance of the composite sintered body, obtained as a result of measurement or test as in Example 1.

Comparative Examples 4 to 5

A commercially available cutting tool having a shape (ISO model No. SNGA120408) the same as that of the cutting tool in Example 1 obtained by brazing the composite sintered body of cubic boron nitride to the base material made of hardmetal was prepared, and Table 4 below shows each performance obtained as a result of measurement or test as in Example 1. The volume percentage and the average particle size of cubic boron nitride in the composite sintered body were measured using the SEM (scanning electron microscope).

TABLE 1

| | No. | cBN Content in Composite Sintered Body [volume %] | Ratio of Average Particle Sizes [X/Y] | Average Particle Size of Total cBN Particles in Composite Sintered Body [µm] | 2-cBN Content in Binder [volume %] | Element | Binder Present at Bonding Interface Between 1-cBN Existence Probability [%] | Initial XRD Measurement |
|---|---|---|---|---|---|---|---|---|
| Example | 1 | 70 | 0.3 | 3.6 | 25 | Ti, Al | 40 | cBN, TiN, $TiB_2$, AlN, $AlB_2$, $Al_2O_3$ |

TABLE 1-continued

| No. | | | | | | | | |
|---|---|---|---|---|---|---|---|---|
| 2 | 70 | 0.3 | 4 | 4 | Ti, Al | 40 | cBN, TiN, TiB$_2$, AlN, AlB$_2$, Al$_2$O$_3$ | |
| 3 | 70 | 0.3 | 2.6 | 67 | Ti, Al | 40 | cBN, TiN, TiB$_2$, AlN, AlB$_2$, Al$_2$O$_3$ | |
| 4 | 70 | 0.3 | 3.6 | 25 | Zr, Ti, Al | 45 | cBN, ZrN, ZrB$_2$, TiB$_2$, TiN, AlN, Al$_2$O$_3$ | |
| 5 | 70 | 0.3 | 3.6 | 25 | Ti, Al | 51 | cBN, TiCN, TiB$_2$, AlN, AlB$_2$, Al$_2$O$_3$ | |
| 6 | 70 | 0.3 | 3.6 | 25 | Hf, Ti, Al | 35 | cBN, HfN, HfB$_2$, TiB$_2$, TiN, AlN, AlB$_2$, Al$_2$O$_3$ | |

| | No. | Thermal Conductivity [W/(m·K)] | XRD Measurement After Acid Treatment | Appearance After Acid Treatment | Transverse Rupture Strength After Acid Treatment | Tool Life in Cutting Test |
|---|---|---|---|---|---|---|
| Example | 1 | 75 | cBN, Al$_2$O$_3$ | original shape maintained | 9.6 [gf/mm$^2$] | 7.3 minutes |
| | 2 | 80 | cBN, Al$_2$O$_3$ | original shape maintained | 10.3 [gf/mm$^2$] | 5.7 minutes |
| | 3 | 66 | cBN, Al$_2$O$_3$ | original shape maintained | 8.8 [gf/mm$^2$] | 4.4 minutes |
| | 4 | 69 | cBN, Al$_2$O$_3$ | original shape maintained | 4.8 [gf/mm$^2$] | 4.8 minutes |
| | 5 | 72 | cBN, Al$_2$O$_3$ | original shape maintained | 7.3 [gf/mm$^2$] | 6.2 minutes |
| | 6 | 70 | cBN, Al$_2$O$_3$ | original shape maintained | 8.1 [gf/mm$^2$] | 6.8 minutes |

In the table above, "cBN" represents "cubic boron nitride."
In the table above, "1-cBN" represents "first cubic boron nitride particles."
In the table above, "2-cBN" represents "second cubic boron nitride particles."

TABLE 2

| | No. | cBN Content in Composite Sintered Body [volume %] | Ratio of Average Particle Sizes [X/Y] | Average Particle Size of Total cBN Particles in Composite Sintered Body [μm] | 2-cBN Content in Binder [volume %] | Binder Present at Bonding Interface Between 1-cBN | |
|---|---|---|---|---|---|---|---|
| | | | | | | Element | Existence Probability [%] |
| Example | 7 | 75 | 0.3 | 3.7 | 25 | Ti, Al | 40 |
| | 8 | 80 | 0.3 | 3.8 | 25 | Ti, Al | 40 |
| | 9 | 65 | 0.3 | 3.5 | 25 | Ti, Al | 40 |
| | 10 | 70 | 0.2 | 2.2 | 25 | Ti, Al | 40 |
| | 11 | 70 | 0.6 | 1.9 | 25 | Ti, Al | 40 |
| | 12 | 70 | 0.033 | 5.2 | 25 | Ti, Al | 40 |

| | No. | Initial XRD Measurement | Thermal Conductivity [W/(m·K)] | XRD Measurement After Acid Treatment | Appearance After Acid Treatment | Transverse Rupture Strength After Acid Treatment | Tool Life in Cutting Test |
|---|---|---|---|---|---|---|---|
| Example | 7 | cBN, TiN, TiB$_2$, AlN, AlB$_2$, Al$_2$O$_3$ | 81 | cBN, Al$_2$O$_3$ | original shape maintained | 11.4 [gf/mm$^2$] | 8.6 minutes |
| | 8 | cBN, TiN, TiB$_2$, AlN, AlB$_2$, Al$_2$O$_3$ | 85 | cBN, Al$_2$O$_3$ | original shape maintained | 11.7 [gf/mm$^2$] | 6.3 minutes |
| | 9 | cBN, TiN, TiB$_2$, AlN, AlB$_2$, Al$_2$O$_3$ | 70 | cBN, Al$_2$O$_3$ | original shape maintained | 9.1 [gf/mm$^2$] | 6.9 minutes |
| | 10 | cBN, TiN, TiB$_2$, | 71 | cBN, | original shape | 13.9 | 7.5 |

TABLE 2-continued

| | | | | | | |
|---|---|---|---|---|---|---|
| | AlN, AlB$_2$, Al$_2$O$_3$ | | Al$_2$O$_3$ | maintained | [gf/mm$^2$] | minutes |
| 11 | cBN, TiN, TiB$_2$, | 68 | cBN, | original shape | 17.2 | 3.6 |
| | AlN, AlB$_2$, Al$_2$O$_3$ | | Al$_2$O$_3$ | maintained | [gf/mm$^2$] | minutes |
| 12 | cBN, TiN, TiB$_2$, | 79 | cBN, | original shape | 2.3 | 3.2 |
| | AlN, AlB$_2$, Al$_2$O$_3$ | | Al$_2$O$_3$ | maintained | [gf/mm$^2$] | minutes |

In the table above, "cBN" represents "cubic boron nitride."

In the table above, "1-cBN" represents "first cubic boron nitride particles."

In the table above, "2-cBN" represents "second cubic boron nitride particles."

TABLE 3

| | No. | cBN Content in Composite Sintered Body [volume %] | Ratio of Average Particle Sizes [X/Y] | Average Particle Size of Total cBN Particles in Composite Sintered Body [μm] | 2-cBN Content in Binder [volume %] | Binder Present at Bonding Interface Between 1-cBN Element | Existence Probability [%] | Initial XRD Measurement |
|---|---|---|---|---|---|---|---|---|
| Example | 13 | 70 | 0.06 | 5.2 | 25 | Ti, Al | 40 | cBN, TiN, TiB$_2$, AlN, AlB$_2$, Al$_2$O$_3$ |
| | 14 | 70 | 0.1 | 4.4 | 25 | Ti, Al | 40 | cBN, TiN, TiB$_2$, AlN, AlB$_2$, Al$_2$O$_3$ |
| | 15 | 70 | 0.45 | 3.7 | 25 | Ti, Al | 40 | cBN, TiN, TiB$_2$, AlN, AlB$_2$, Al$_2$O$_3$ |
| | 16 | 70 | 0.3 | 3.9 | 6 | Ti, Al | 40 | cBN, TiN, TiB$_2$, AlN, AlB$_2$, Al$_2$O$_3$ |
| | 17 | 70 | 0.3 | 3.8 | 15 | Ti, Al | 40 | cBN, TiN, TiB$_2$, AlN, AlB$_2$, Al$_2$O$_3$ |
| | 18 | 70 | 0.3 | 3.3 | 35 | Ti, Al | 40 | cBN, TiN, TiB$_2$, AlN, AlB$_2$, Al$_2$O$_3$ |
| | 19 | 70 | 0.3 | 3.0 | 45 | Ti, Al | 40 | cBN, TiN, TiB$_2$, AlN, AlB$_2$, Al$_2$O$_3$ |

| | No. | Thermal Conductivity [W/(m · K)] | XRD Measurement After Acid Treatment | Appearance After Acid Treatment | Transverse Rupture Strength After Acid Treatment | Tool Life in Cutting Test |
|---|---|---|---|---|---|---|
| Example | 13 | 82 | cBN, Al$_2$O$_3$ | original shape maintained | 8.5 [gf/mm$^2$] | 6.9 minutes |
| | 14 | 80 | cBN, Al$_2$O$_3$ | original shape maintained | 9.0 [gf/mm$^2$] | 7.1 minutes |
| | 15 | 77 | cBN, Al$_2$O$_3$ | original shape maintained | 9.2 [gf/mm$^2$] | 7.0 minutes |
| | 16 | 80 | cBN, Al$_2$O$_3$ | original shape maintained | 9.9 [gf/mm$^2$] | 6.3 minutes |
| | 17 | 78 | cBN, Al$_2$O$_3$ | original shape maintained | 9.7 [gf/mm$^2$] | 7.0 minutes |
| | 18 | 73 | cBN, Al$_2$O$_3$ | original shape maintained | 9.3 [gf/mm$^2$] | 7.2 minutes |
| | 19 | 71 | cBN, Al$_2$O$_3$ | original shape maintained | 8.0 [gf/mm$^2$] | 5.6 minutes |

In the table above, "cBN" represents "cubic boron nitride."

In the table above, "1-cBN" represents "first cubic boron nitride particles."

In the table above, "2-cBN" represents "second cubic boron nitride particles."

TABLE 4

| No. | | cBN Content in Composite Sintered Body [volume %] | Ratio of Average Particle Sizes [X/Y] | Average Particle Size of Total cBN in Composite Sintered Body [μm] | cBN Content in Binder [volume %] | Binder Present at Bonding Interface Between cBN Particles | | Initial XRD Measurement |
|---|---|---|---|---|---|---|---|---|
| | | | | | | Element | Existence Probability [%] | |
| Comparative Example | 1 | 70 | 0.3 | 3.6 | 25 | — | — | cBN, TiN, TiB$_2$, AlN, AlB$_2$, Al$_2$O$_3$ |
| | 2 | 85 | 0.3 | 3.8 | 25 | Ti, Al | 34 | cBN, TiN, TiB$_2$, AlN, AlB$_2$, Al$_2$O$_3$ |
| | 3 | 70 | 0.3 | 3.6 | 0 | Ti, Al | 25 | cBN, TiN, TiB$_2$, AlN, AlB$_2$, Al$_2$O$_3$ |
| | 4 | 65 | — | 3 | unknown | — | — | cBN, TiN, TiB$_2$, AlN, AlB$_2$, Al$_2$O$_3$ |
| | 5 | 55 | — | 3.2 | unknown | — | — | cBN, TiN, TiB$_2$, AlN, AlB$_2$, Al$_2$O$_3$ |

| | No. | Thermal Conductivity [W/(m·K)] | XRD Measurement After Acid Treatment | Appearance After Acid Treatment | Transverse Rupture Strength After Acid Treatment | Tool Life in Cutting Test |
|---|---|---|---|---|---|---|
| Comparative Example | 1 | 57 | cBN, Al$_2$O$_3$ | collapsed | not available | 1.2 minute |
| | 2 | 72 | Note 1 | original shape maintained | 75 [kgf/mm$^2$] | 1.1 minute |
| | 3 | 77 | cBN, Al$_2$O$_3$ | original shape maintained | 9.9 [gf/mm$^2$] | 2.2 minutes |
| | 4 | 54 | cBN, Al$_2$O$_3$ | collapsed | not available | 0.7 minute |
| | 5 | 45 | cBN, Al$_2$O$_3$ | collapsed | not available | 0.3 minute |

In the table above, "cBN" represents "cubic boron nitride."
Note 1) cBN, TiN, TiB$_2$, AlN, AlB$_2$, Al$_2$O$_3$ (trace amount was detected except for cBN)

As can clearly be seen from Tables 1 to 3, in the composite sintered bodies according to Examples 1 to 19, solely cubic boron nitride was detected in XRD measurement after acid treatment (although Al$_2$O$_3$ was partially contained). This fact indicates that the binder has the continuous structure as a result of bonding of a plurality of binder particles to each other. In addition, this fact simultaneously indicates that the binder having the discontinuous structure is not present at the bonding interface where the first cubic boron nitride particles are bonded to each other. Here, it has been confirmed through TEM observation, EDS analysis and AES analysis that the binder is present at the bonding interface. Therefore, the fact simultaneously indicates that the binder present at the bonding interface is present as a part of the continuous structure as a result of its continuity to the continuous structure of the binder particles. This fact is also supported by the transverse rupture strength after the acid treatment that attains to a value from at least 1 gf/mm$^2$ to at most 70 kgf/mm$^2$.

In addition, appearance of the treated body after acid treatment was visually observed. The composite sintered bodies according to Examples 1 to 19 fully maintained their original shapes, and transverse rupture strength also attained to the value from at least 1 gf/mm$^2$ to at most 70 kgf/mm$^2$. Therefore, this fact indicates that cubic boron nitride has the continuous skeleton structure as a result of bonding of a plurality of first cubic boron nitride particles to each other.

At the same time, it was confirmed through SEM observation and TEM observation that, in the composite sintered bodies according to Examples 1 to 19, by using the TiN-coated cubic boron nitride powders as a part of cubic boron nitride, the second cubic boron nitride particles isolated from the first cubic boron nitride particles forming the skeleton structure were present in a manner dispersed in the continuous structure of the binder particles. The fact is also supported by the result obtained in SEM observation of the cubic boron nitride particles contained in the mixed acid after the acid treatment that the cubic boron nitride particles having the average particle size further smaller than the average particle size of the TiN-coated cubic boron nitride powder used as the raw material were contained in the mixed acid.

On the other hand, as can clearly be seen from Table 4, in Comparative Example 1, collapse of the shape was confirmed in observation of appearance after acid treatment. Therefore, this fact indicates that the cubic boron nitride particles have the discontinuous structure, not the continuous structure. Accordingly, the comparative example has lower thermal conductivity and poorer tool life in the cutting test, as compared with those in the examples. For this reason, the composition and the existence probability of the binder at the bonding interface between the cubic boron nitride particles could not be measured (therefore, denoted as "-" in Table 4).

In Comparative Example 2, the original shape was maintained when appearance after acid treatment was observed.

Therefore, it is considered that the apparently continuous structure in which the cubic boron nitride particles were bonded to each other was attained. On the other hand, a trace amount of the binder component (TiN, TiB$_2$, AlN, AlB$_2$, Al$_2$O$_3$) was detected in XRD measurement after acid treatment, and transverse rupture strength after acid treatment exceeded 70 kgf/mm$^2$. Therefore, this fact indicates that the binder is present as the isolated, discontinuous structure surrounded by the continuous structure of cubic boron nitride. Therefore, the tool life in the cutting test was poor.

Meanwhile, in Comparative Example 3, since the original shape was maintained as found in observation of appearance after the acid treatment, it is considered that the continuous structure was formed as a result of bonding of the cubic boron nitride particles to each other. Moreover, as solely cubic boron nitride was detected in XRD measurement after the acid treatment (although Al$_2$O$_3$ was partially contained), it is considered that the binder had the continuous structure as a result of bonding of a plurality of binder particles to each other. Here, however, the TiN-coated cubic boron nitride as in Example 1 was not used. Therefore, in observation with the SEM and the TEM, it was found that the cubic boron nitride particles were not dispersed in the continuous structure of the binder particles, and hence the cubic boron nitride particles were not contained in the mixed acid after the acid treatment either. It is thus considered that, as the cubic boron nitride particles were not dispersed in the binder, in the high-speed heavy interrupted cutting test in which high impact is applied to the cutting edge, small cracking occurred at the binder portion, which led to chipping at an early stage, and therefore, the result of the cutting test indicated poor tool life.

In Comparative Examples 4 to 5, it was confirmed, by visually observing appearance of the treated body after acid treatment, that the original shape was not maintained but collapsed. This fact indicates that bonding between the cubic boron nitride particles is insufficient and the structure is discontinuous. For this reason, the composition and the existence probability of the binder at the bonding interface between the cubic boron nitride particles could not be measured (therefore, denoted as "-" in Table 4). In addition, as the commercially available product was used in these comparative examples, the content of cubic boron nitride in the binder was unknown and transverse rupture strength could not be measured either.

As a result of the cutting test, the cutting tools in Examples 1 to 19 had the tool life twice as long as that of the cutting tools in Comparative Examples 1 to 5. This fact indicates that each composite sintered body in the examples contains cubic boron nitride having the continuous skeleton structure as a result of bonding of a plurality of first cubic boron nitride particles to each other and the binder having the continuous structure as a result of bonding of a plurality of binder particles to each other and the composite sintered body exhibits such a structure that the second cubic boron nitride particles isolated from the first cubic boron nitride particles forming the skeleton structure were dispersed in the continuous structure of the binder particles, and that improvement in heat resistance and improvement in comprehensive strength (effect to suppress generation and development of small cracking) were thus both highly attained and hence the tool life was significantly extended.

Example 20

The cubic boron nitride powders having a larger particle size (average particle size 4.0 µm) used in Example 1 were subjected to hydrogen plasma treatment with microwave plasma for 30 minutes at a temperature of 1000° C. in a hydrogen flow under a reduced pressure of 1.333×10$^4$ Pa (100 torr) using a microwave reactor. Thereafter, the powders thus obtained were again stirred, and the hydrogen plasma treatment under the same condition as above was repeated seven times, thus obtaining the cubic boron nitride powders having the surface treated.

The composite sintered body according to the present invention was obtained under the manufacturing condition the same as in Example 1, except that the cubic boron nitride powders thus obtained were used instead of the cubic boron nitride powders having a larger particle size (average particle size 4.0 µm) used in Example 1. Table 5 below shows each performance of the composite sintered body, obtained as a result of measurement or test as in Example 1.

Example 21

The cubic boron nitride powders having a larger particle size (average particle size 4.0 µm) in Example 7 were subjected to heat treatment for 30 minutes at a temperature of 1200° C. in an ammonia atmosphere, thus obtaining the cubic boron nitride powders having the surface treated.

The composite sintered body according to the present invention was obtained under the manufacturing condition the same as in Example 7, except that the cubic boron nitride powders thus obtained were used instead of the cubic boron nitride powders having a larger particle size (average particle size 4.0 µm) used in Example 7. Table 5 below shows each performance of the composite sintered body, obtained as a result of measurement or test as in Example 1.

Example 22

In Example 1, the TiN-coated cubic boron nitride powders (average particle size 1.2 µm), the raw material powders for the binder, and the cubic boron nitride powders having a larger particle size (average particle size 4.0 µm) were homogenously mixed using the ball mill at such a blending ratio that the cubic boron nitride powders accounted for 80 volume % (here, the blending ratio between the TiN-coated cubic boron nitride powders and the cubic boron nitride powders having a large particle size was adjusted such that the content of the second cubic boron nitride particles dispersed in the continuous structure of the binder particles accounts for 30 volume %). Thereafter degassing was performed under the condition the same as in Example 1, and the composite sintered body according to the present invention was obtained under the manufacturing condition the same as in Example 1 except for adding 3 mass % melamine resin powders (commercially available product) to the degassed, mixed powders. Table 5 below shows each performance of the composite sintered body, obtained as a result of measurement or test as in Example 1.

Example 23

The cubic boron nitride powders having a larger particle size (average particle size 4.0 µm) in Example 9 were subjected to heat treatment for 30 minutes at a temperature of 1600° C. in a nitrogen atmosphere, thus obtaining the cubic boron nitride powders having the surface treated.

The composite sintered body according to the present invention was obtained under the manufacturing condition the same as in Example 9, except that the cubic boron nitride powders thus obtained were used instead of the cubic boron nitride powders having a larger particle size (average particle size 4.0 μm) used in Example 9. Table 5 below shows each performance of the composite sintered body, obtained as a result of measurement or test as in Example 1.

and high pressure, and bonding between the first cubic boron nitride particles in the skeleton structure was further strengthened.

TABLE 5

| No. | | cBN Content in Composite Sintered Body [volume %] | Binder Present at Bonding Interface Between 1-cBN | | Initial XRD Measurement | Thermal Conductivity [W/(m·K)] | XRD | | Transverse Rupture Strength After Acid Treatment | Tool Life in Cutting Test |
|---|---|---|---|---|---|---|---|---|---|---|
| | | | Element | Existence Probability [%] | | | Measurement After Acid Treatment | Appearance After Acid Treatment | | |
| Example | 20 | 70 | Ti, Al | 15 | cBN, TiN, TiB$_2$, AlN, AlB$_2$ | 82 | cBN | original shape maintained | 11.9 [gf/mm$^2$] | 8.8 minutes |
| | 21 | 75 | — | 0 | cBN, TiN, TiB$_2$, AlN, AlB$_2$ | 95 | cBN | original shape maintained | 13.5 [gf/mm$^2$] | 10.3 minutes |
| | 22 | 80 | Ti, Al | 25 | cBN, TiN, TiB$_2$, AlN, AlB$_2$, Al$_2$O$_3$ | 90 | cBN, Al$_2$O$_3$ | original shape maintained | 12.7 [gf/mm$^2$] | 7.4 minutes |
| | 23 | 65 | Ti, Al | 5 | cBN, TiN, TiB$_2$, AlN, AlB$_2$ | 80 | cBN | original shape maintained | 11.7 [gf/mm$^2$] | 8.0 minutes |

In the table above, "cBN" represents "cubic boron nitride."
In the table above, "1-cBN" represents "first cubic boron nitride particles."

As can clearly be seen from each result in Table 5, each of the composite sintered bodies according to Examples 20 to 23 above has the continuous skeleton structure as a result of bonding of a plurality of first cubic boron nitride particles to each other and the continuous structure as a result of bonding of a plurality of binder particles to each other. Moreover, not only the composite sintered body was subjected to SEM observation and TEM observation, but also presence in the mixed acid after the acid treatment, of the cubic boron nitride particles having a particle size smaller than that of the TiN-coated cubic boron nitride used as the raw material was confirmed in SEM observation. Thus, such a structure that the second cubic boron nitride particles isolated from the first cubic boron nitride particles forming the skeleton structure were dispersed in the continuous structure of the binder particles was confirmed.

In addition, the cutting tools including the composite sintered bodies according to Examples 20 to 23 had the tool life further longer than the cutting tools including the composite sintered bodies according to Examples 1, 7, 8, and 9 each having corresponding content of cubic boron nitride. Moreover, in the composite sintered bodies according to Examples 20 to 23, the existence probability of the binder at the bonding interface where the first cubic boron nitride particles are bonded to each other is further lower than that in the composite sintered bodies according to Examples 1, 7, 8, and 9. Therefore, the composite sintered bodies according to Examples 20 to 23 were superior in thermal conductivity and transverse rupture strength after the acid treatment to the composite sintered bodies according to Examples 1, 7, 8, and 9. It appears that such a result was obtained for the following reasons.

Specifically, in Example 20, it is considered that oxygen was effectively removed at the surface of the cubic boron nitride powders having the surface treated in hydrogen plasma treatment and that the surface was simultaneously terminated with hydrogen group. In addition, the reason why the result as above was obtained is estimated as follows. Specifically, the hydrogen group present at the surface in this manner attained a catalytic function at the high temperature Meanwhile, in Example 21, it is considered that oxygen was effectively removed at the surface of the cubic boron nitride powders having the surface treated in ammonia treatment and that the surface was simultaneously terminated with amino group. In addition, the reason why the result as above was obtained is estimated as follows. Specifically, the amino group present at the surface in this manner attained a catalytic function at the high temperature and high pressure, and bonding between the first cubic boron nitride particles in the skeleton structure was further strengthened.

In Example 22, it is considered that carbon free radical (such as —CH$_3$ group), hydrogen free radical (such as —H group), and nitrogen free radical (such as —NH$_2$ group) were present around the cubic boron nitride particles, as a result of addition of 3 mass % melamine powders. The carbon free radical is considered to attain a function to remove an oxygen impurity such as B$_2$O$_3$ or the like present at the surface of the cubic boron nitride particles as a result of reaction to the same, and the hydrogen free radical and the nitrogen free radical are considered to attain a catalytic function to promote polycrystallization of cubic boron nitride. It is estimated that the result as above was obtained because the bonding between the first cubic boron nitride particles in the skeleton structure was further strengthened.

In Example 23, it is considered that oxygen was effectively removed at the surface of the cubic boron nitride particles having the surface treated in high-temperature heat treatment in the nitrogen atmosphere and simultaneously cubic boron nitride was inversely converted to hexagonal boron nitride. Hexagonal boron nitride thus existing only at the surface in this manner is considered to produce firm bonding, simultaneously with inverse conversion again to cubic boron nitride under high pressure and high temperature at the portion where the cubic boron nitride particles come in contact with each other, and it is estimated that the result above was obtained because bonding between the first cubic boron nitride particles in the skeleton structure was further strengthened.

Example 24

Initially, Ti$_X$N$_Y$ (where X=1 and Y=0.6) powders and Al powders were homogenously mixed at a mass ratio of 85:15, and thereafter the mixed powders were subjected to heat treatment for 30 minutes at a temperature of 1200° C. in vacuum using a vacuum furnace. Thereafter, a ball mill constituted of a pot made of hardmetal and a ball made of hardmetal was used to break the mixed powders that were subjected to heat treatment as described above, thus obtaining the raw material powders for the binder.

In succession, the RF sputtering PVD apparatus was used to coat the cubic boron nitride powder having a smaller particle size (average particle size 0.5 µm) with TiN (composing the binder). Observing the coated powder with the TEM (transmission electron microscope), it was found that the cubic boron nitride powder was substantially homogenously coated with TiN to an average layer thickness of 50 nm. The powders provide the second cubic boron nitride particles to be dispersed in the continuous structure of the binder particle.

The TiN-coated cubic boron nitride powders obtained as above and the cubic boron nitride powders having a larger particle size (average particle size 3.5 µm, not coated with the binder, and mainly forming the skeleton structure) were prepared, to satisfy a volume ratio of 1:4. Thereafter, the ball mill above was used to homogenously mix these cubic boron nitride powders and the raw material powders for the binder above, such that a blending ratio of the cubic boron nitride powders attains to 72 volume %. Here, after the TiN-coated cubic boron nitride powders and the binder powders were mixed in advance, the cubic boron nitride powders having a larger particle size (average particle size 3.5 µm) were added and mixed again, so as to achieve homogenous dispersion. Thereafter, the mixed powders were held in the vacuum furnace for 20 minutes at a temperature of 900° C. for degassing.

Then, the mixed powders degassed as above were sandwiched between the metal foils made of TiAl alloy (Ti (50 atomic %) Al (50 atomic %)) and filled the capsule made of molybdenum (Mo). Thereafter, the pressure and the temperature were simultaneously raised to 3 GPa and 500° C. using an ultra-high pressure apparatus respectively, and the mixed powders were maintained for 2 minutes under this pressure and temperature condition (first pressurization and temperature increase).

Successively, the pressure and the temperature were simultaneously raised to 7.0 GPa and 1850° C. using this apparatus respectively (second pressurization and temperature increase), and the mixed powders were maintained for 15 minutes under this pressure and temperature condition for sintering. The composite sintered body according to the present invention at least containing cubic boron nitride and the binder was thus manufactured.

The composite sintered body was subjected to initial XRD measurement, observation of the sintered body texture with the SEM and the TEM, thermal conductivity measurement (before acid treatment), XRD measurement after acid treatment, observation of appearance after acid treatment, and measurement of transverse rupture strength after acid treatment as in Example 1. Table 6 below shows the result.

Example 25

The composite sintered body according to the present invention was manufactured as in Example 24, except that the blending ratio of the cubic boron nitride powders in Example 24 was set to 80 volume % and the powders were homogenously mixed. Table 6 below shows each performance of the composite sintered body measured as in Example 24.

Example 26

The composite sintered body according to the present invention was manufactured as in Example 24, except that the blending ratio of the cubic boron nitride powders in Example 24 was set to 77 volume % and the powders were homogenously mixed. Table 6 below shows each performance of the composite sintered body measured as in Example 24.

Example 27

The composite sintered body according to the present invention was manufactured as in Example 24, except that the blending ratio of the cubic boron nitride powders in Example 24 was set to 65 volume % and the powders were homogenously mixed. Table 6 below shows each performance of the composite sintered body measured as in Example 24.

Example 28

The composite sintered body according to the present invention was manufactured as in Example 24, except that the condition of the pressure of 7.0 GPa and the temperature of 1850° C. in Example 24 was maintained for 60 minutes. Table 6 below shows each performance of the composite sintered body measured as in Example 24.

Example 29

The composite sintered body according to the present invention was manufactured as in Example 24, except that the condition of the pressure of 7.0 GPa and the temperature of 1850° C. in Example 24 was maintained for 40 minutes. Table 6 below shows each performance of the composite sintered body measured as in Example 24.

Example 30

The composite sintered body according to the present invention was manufactured as in Example 24, except that the conditions in the second pressurization and temperature increase in Example 24 were set to 5.5 GPa and 1850° C. Table 6 below shows each performance of the composite sintered body measured as in Example 24.

Example 31

The composite sintered body according to the present invention was manufactured as in Example 24, except that the conditions in the second pressurization and temperature increase in Example 24 were set to 5.5 GPa and 1700° C. Table 6 below shows each performance of the composite sintered body measured as in Example 24.

Example 32

The composite sintered body according to the present invention was manufactured as in Example 24, except that the conditions in the second pressurization and temperature increase in Example 24 were set to 5.5 GPa and 1550° C. Table 6 below shows each performance of the composite sintered body measured as in Example 24.

Comparative Example 6

The composite sintered body according to the comparative example was manufactured as in Example 24, except for not using the metal foil made of TiAl alloy (Ti (50 atomic %) Al (50 atomic %)) in filling the capsule made of molybdenum (Mo) with the mixed powders and except for adopting such conditions that the pressure was raised to 5.5 GPa at a room temperature and thereafter the temperature was raised to 1550° C. as in the conventional method, followed by sintering for 30 minutes, instead of the condition for sintering in Example 24. Table 6 below shows each performance of the composite sintered body measured as in Example 24.

TABLE 6

| No. | | cBN Content in Composite Sintered Body [volume %] | Thermal Conductivity [W/(m · K)] | Initial XRD Measurement | XRD Measurement After Acid Treatment | Appearance After Acid Treatment | Transverse Rupture Strength After Acid Treatment [kgf/mm²] |
|---|---|---|---|---|---|---|---|
| Example | 24 | 72 | 96 | cBN, TiN, TiB₂, AlN, AlB₂, AlON | cBN, Al₂O₃ | original shape maintained | 1.1 |
| | 25 | 80 | 124 | cBN, TiN, TiB₂, AlN, AlB₂, AlON | cBN, Al₂O₃ | original shape maintained | 65 |
| | 26 | 77 | 102 | cBN, TiN, TiB₂, AlN, AlB₂, AlON | cBN, Al₂O₃ | original shape maintained | 9 |
| | 27 | 65 | 78 | cBN, TiN, TiB₂, AlN, AlB₂, AlON | cBN, Al₂O₃ | original shape maintained | 0.02 |
| | 28 | 72 | 110 | cBN, TiN, TiB₂, AlN, AlB₂, AlON | cBN, Al₂O₃ | original shape maintained | 2.3 |
| | 29 | 72 | 103 | cBN, TiN, TiB₂, AlN, AlB₂, AlON | cBN, Al₂O₃ | original shape maintained | 1.7 |
| | 30 | 72 | 92 | cBN, TiN, TiB₂, AlN, AlB₂, AlON | cBN, Al₂O₃ | original shape maintained | 0.9 |
| | 31 | 72 | 84 | cBN, TiN, TiB₂, AlN, AlB₂, AlON | cBN, Al₂O₃ | original shape maintained | 0.05 |
| | 32 | 72 | 77 | cBN, TiN, TiB₂, AlN, AlB₂, AlON | cBN, Al₂O₃ | original shape maintained | 0.001 |
| Comparative Example | 6 | 72 | 61 | cBN, TiN, TiB₂, AlN, AlB₂ | cBN, Al₂O₃ | collapsed | not available |

In the table above, "cBN" represents "cubic boron nitride."

As can clearly be seen from each result in Table 6, in all the composite sintered bodies according to Examples 24 to 32 above, cubic boron nitride has the continuous skeleton structure as a result of bonding of a plurality of first cubic boron nitride particles to each other, and the binder has the continuous structure as a result of bonding of a plurality of binder particles to each other. At the same time, it was found through SEM observation and TEM observation that, in the composite sintered bodies according to Examples 24 to 32, the second cubic boron nitride particles (isolated from the first cubic boron nitride particles forming the skeleton structure) were dispersed in the continuous structure of the binder particles, because cubic boron nitride smaller in particle size and coated with TiN in advance was blended.

On the other hand, in the composite sintered body according to Comparative Example 6, collapse of the shape was confirmed in observation of appearance after acid treatment. Therefore, this fact indicates that all the cubic boron nitride particles have the discontinuous structure, not the structure continuous to each other. Accordingly, the comparative example has lower thermal conductivity and poorer tool life in the cutting test which will be described later, as compared with those in each example.

The composite sintered bodies obtained in Examples 24 to 32 and Comparative Example 6 were subjected to TEM (transmission electron microscope) observation, so as to measure an average particle size of the aluminum compound contained in the binder particles and an average particle size of the binder except for the aluminum compound, as well as to EDS analysis and AES analysis, so as to conduct element analysis of the aluminum compound, thus measuring the ratio in the binder. Table 7 below shows the result.

Meanwhile, the cutting tool was fabricated using each composite sintered body (before acid treatment) manufactured as above. Specifically, each composite sintered body manufactured as above was brazed to a base material made of hardmetal and formed in a prescribed shape (ISO model No. SNGA120408), to manufacture the cutting tool. Using this cutting tool, a cutting test in which the cutting tool was used to rough-cut bearing steel was conducted under the conditions below, so as to determine a flank wear width after 5-minute cutting and the tool life until it is chipped. Table 7 below shows the result.

<Condition for Cutting Test>
Work material: Bearing steel SUJ2, BRC64 (diameter 100 mm×length 300 mm; round rod)
Cutting speed: V=120 nm/min.
Feed rate: f=0.15 nm/rev.
Depth of cut: d=0.4 mm
Wet/Dry: Dry

TABLE 7

| No. | | Average Particle Size of Aluminum Compound | Average Particle Size of Binder Except for Aluminum Compound | Ratio of $Al_XO_YN_Z$ in Binder | Ratio of $Al_SB_TO_UN_V$ in Binder | Total Ratio of $Al_XO_YN_Z$ and $Al_SB_TO_UN_V$ in Binder | Flank Wear Width After 5-Minute Cutting | Tool Life in Cutting Test |
|---|---|---|---|---|---|---|---|---|
| Example | 24 | 0.5 μm | 175 nm | 16 volume % | 6 volume % | 22 volume % | 0.075 mm | 17.5 minutes |
| | 25 | 0.45 μm | 168 nm | 18 volume % | 9 volume % | 27 volume % | 0.102 mm | 9.3 minutes |
| | 26 | 0.5 μm | 170 nm | 17 volume % | 8 volume % | 25 volume % | 0.085 mm | 13.4 minutes |
| | 27 | 0.4 μm | 166 nm | 17 volume % | 3 volume % | 20 volume % | 0.061 mm | 14.1 minutes |
| | 28 | 2.4 μm | 345 nm | 20 volume % | 15 volume % | 35 volume % | 0.107 mm | 9.3 minutes |
| | 29 | 1.2 μm | 207 nm | 18 volume % | 10 volume % | 28 volume % | 0.085 mm | 12.5 minutes |
| | 30 | 1.5 μm | 700 nm | 1.6 volume % | 2.1 volume % | 3.7 volume % | 0.120 mm | 5.3 minutes |
| | 31 | 0.7 μm | 550 nm | 1.5 volume % | 1.5 volume % | 3.0 volume % | 0.100 mm | 5.7 minutes |
| | 32 | 35 nm | 57 nm | 1 volume % | 0.5 volume % | 1.5 volume % | 0.082 mm | 7.2 minutes |
| Comparative Example | 6 | 22 nm | 80 nm | 0.5 volume % | 0 volume % | 0.5 volume % | — | 3.1 minutes |

As a result of EDS analysis and AES analysis, $Al_XO_YN_Z$ and $Al_SB_TO_UN_V$ were detected at the interface between cubic boron nitride and the binder, and $Al_XO_YN_Z$ was detected at the interface between the binder particles. It is estimated that $Al_SB_TO_UN_V$ was not detected in XRD measurement because, among the aluminum compounds that are the binder components, $Al_SB_TO_UN_V$ was probably present in an amorphous state.

As a result of the cutting test, Examples 24 to 32 proved to have a longer tool life than Comparative Example 6. This may be because both of cubic boron nitride and the binder in the composite sintered body in each example had the continuous structure and the second cubic boron nitride particles having a smaller particle size were dispersed in the continuous structure of the binder particles.

It is considered that, though Example 28 is equal to Examples 24 and 29 in the content of cubic boron nitride, the strength of the composite sintered body was lower in Example 28 than in Examples 24 and 29, because the average particle size of the aluminum compound in Example 28 was larger than in Examples 24 and 29. In addition, the ratio of $Al_XO_YN_Z$ and $Al_SB_TO_UN_V$ in the binder exceeded 30 volume % in Example 28, and it is considered that the content of the binder component having relatively good toughness other than the aluminum compound was low. Therefore, it is estimated that the tool life in Example 28 was shorter than in Examples 24 and 29.

In addition, in Examples 30 to 32, it is considered that thermal conductivity was lower than in Examples 24, 28 and 29 because the ratio of $Al_XO_YN_Z$ and $Al_SB_TO_UN_V$ in the binder was less than 5 volume % and most part of the aluminum compound was present as AlN and $Al_2O_3$. It is thus estimated that the tool life in Examples 30 to 32 was poorer than in Examples 24, 28 and 29.

Moreover, in Examples 30 and 31, it is considered that the binder except for the aluminum compound has the average particle size exceeding 400 nm and the strength of the binder has significantly lowered. The flank wear width after 5-minute cutting in Examples 30 and 31 was greater than in Example 29 and it is thus estimated that the tool life was also poorer.

Though the embodiments and examples of the present invention have been described above, combination of embodiments and examples described above as appropriate is originally intended.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A composite sintered body comprising:
cubic boron nitride; and
a binder, wherein:
said cubic boron nitride has a continuous skeleton structure as a result of bonding of a plurality of first cubic boron nitride particles to each other,
said binder has a continuous structure as a result of bonding of a plurality of binder particles to one another, the binder particles being present in a region except for a bonding interface where said first cubic boron nitride particles are bonded to each other,
second cubic boron nitride particles, which are isolated from said first cubic boron nitride particles forming said continuous skeleton structure, are dispersed in said continuous structure of said binder particles,
a relation of $0.05 \leq X/Y \leq 0.5$ is satisfied, where said second cubic boron nitride particles dispersed in said continuous structure have an average particle size of X μm, and said first cubic boron nitride particles have an average particle size of Y μm, and
said second cubic boron nitride particles are dispersed in said continuous structure at a ratio in a range from at least 5 volume % to at most 50 volume %.

2. The composite sintered body according to claim 1, wherein
said second cubic boron nitride particles are dispersed in said continuous structure at a ratio in a range from at least 15 volume % to at most 40 volume %.

3. The composite sintered body according to claim 1, wherein
said binder contains at least one of a compound and a solid solution of one or more elements selected from Ti, Zr, Hf, V, and Cr, and one or more elements selected from nitrogen, carbon, boron, and oxygen, and an aluminum compound.

4. The composite sintered body according to claim 3, wherein:
said aluminum compound comprises: a compound of aluminum, oxygen and nitrogen and/or a compound of aluminum, oxygen, nitrogen, and boron,
said aluminum compound has an average particle size of at least 50 nm to at most 1 μm, and
a ratio of said aluminum compound in said binder is at least 5 volume % to at most 30 volume %.

5. The composite sintered body according to claim 4, having thermal conductivity of at least 70 W/(m·K) to at most 150 W/(m·K).

6. The composite sintered body according to claim 3, wherein
in said binder, the compound or the solid solution except for said aluminum compound has an average particle size of at most 400 nm.

7. The composite sintered body according to claim 1, wherein:
said binder is present at the bonding interface where said first cubic boron nitride particles are bonded to each other at existence probability of at most 60%, and
said binder is present as a part of the continuous structure as a result of continuity to the continuous structure of said binder particles or as a discontinuous structure isolated from the continuous structure of said binder particles.

8. The composite sintered body according to claim 7, wherein
said binder has composition containing at least Ti or Al at the bonding interface where said first cubic boron nitride particles are bonded to each other.

9. The composite sintered body according to claim 1, wherein
said binder is absent at the bonding interface where said first cubic boron nitride particles are bonded to each other.

10. The composite sintered body according to claim 1, having transverse rupture strength after acid treatment of at least 1 gf/mm² to at most 70 kgf/mm².

11. The composite sintered body according to claim 1, wherein
said cubic boron nitride is contained in said composite sintered body by at least 60 volume % to at most 85 volume %.

12. The composite sintered body according to claim 1, wherein
total cubic boron nitride particles including both of said first cubic boron nitride particles and said second cubic boron nitride particles have an average particle size of at least 2 μm to at most 10 μm.

13. The composite sintered body according to claim 1, having thermal conductivity of at least 60 W/(m·K) to at most 150 W/(m·K).

14. A cutting tool comprising the composite sintered body according to claim 1.

15. A composite sintered body comprising:
cubic boron nitride; and
a binder, wherein:
said cubic boron nitride has a continuous skeleton structure as a result of bonding of a plurality of first cubic boron nitride particles to each other,
said binder has a continuous structure as a result of bonding of a plurality of binder particles to each other, the binder particles being present in a region except for a bonding interface where said first cubic boron nitride particles are bonded to each other,
second cubic boron nitride particles, which are isolated from said first cubic boron nitride particles forming said continuous skeleton structure, are dispersed in said continuous structure of said binder particles,
substantially no compound other than cubic boron nitride and $Al_2O_3$ is detected in X-ray diffraction measurement after acid treatment,
a relation of $0.05 \leq X/Y \leq 0.5$ is satisfied, where said second cubic boron nitride particles dispersed in said continuous structure have an average particle size of X μm, and said first cubic boron nitride particles have an average particle size of Y μm, and
said second cubic boron nitride particles are dispersed in said continuous structure at a ratio in a range from at least 5 volume % to at most 50 volume %.

* * * * *